United States Patent
Hamm

(10) Patent No.: US 11,396,213 B1
(45) Date of Patent: Jul. 26, 2022

(54) BRACKET ASSEMBLY FOR A MULTI-LINK SUSPENSION SYSTEM

(71) Applicant: Hammer Concepts and Designs, LLC, Clarksville, TN (US)

(72) Inventor: Brian Hamm, Clarksville, TN (US)

(73) Assignee: Hammer Concepts and Designs, LLC, Clarksville, TN (US)

( * ) Notice: Subject to any disclaimer, the term of this patent is extended or adjusted under 35 U.S.C. 154(b) by 65 days.

(21) Appl. No.: 17/143,327

(22) Filed: Jan. 7, 2021

(51) Int. Cl.
 *B60G 7/00* (2006.01)

(52) U.S. Cl.
 CPC .............. *B60G 7/001* (2013.01); *B60G 7/008* (2013.01)

(58) Field of Classification Search
 CPC ..... B60G 2204/61; B60G 7/001; B60G 7/008
 See application file for complete search history.

(56) References Cited

U.S. PATENT DOCUMENTS

| | | | | |
|---|---|---|---|---|
| 5,333,896 | A * | 8/1994 | Creighton | F16C 35/06 180/905 |
| 5,803,200 | A * | 9/1998 | Brandt | B60G 9/00 280/124.1 |
| 6,167,361 | A * | 12/2000 | Bristow | B60G 9/00 703/1 |
| 6,698,775 | B2 * | 3/2004 | Ness | B60G 7/02 403/3 |
| 7,077,407 | B2 * | 7/2006 | Shin | B60G 21/05 280/124.137 |

(Continued)

FOREIGN PATENT DOCUMENTS

| | | |
|---|---|---|
| CN | 210174972 U | 3/2020 |
| CN | 210211949 U | 3/2020 |

(Continued)

OTHER PUBLICATIONS

Website of Moore Good Ink; Author: moore1; date of post May 11, 2018; Title: The 4-link system; https://mooregoodink.com/the-4-link-system-who-deserves-credit-for-its-invention/Date of Access/Retrieval: Jan. 29, 2021.

(Continued)

*Primary Examiner* — Drew J Brown
*Assistant Examiner* — Timothy Wilhelm
(74) *Attorney, Agent, or Firm* — Dominic A. Rota; Patterson Intellectual Property Law, PC

(57) ABSTRACT

A bracket assembly for a multi-link suspension system is provided, said bracket assembly mounted to a housing of an automotive vehicle, as opposed to a chassis of the automotive vehicle, enabling modularity and ease of replacement of the housing and adjustability of suspensions system components. The bracket assembly may have a body, wherein the body includes: an axle tube hole; one or more cross tube support holes; at least one trailing arm attachment portion having a first plurality of adjustment holes and a second plurality of adjustment holes; an anti-roll bar attachment portion having one or more attachment holes; and a shock attachment portion having a plurality of attachment holes. Further, the bracket assembly may include one or more engagement points, configured to support a number of said suspension system components, such as at least one trailing arm, an anti-roll bar, a shock absorber coupler, and a shock absorber.

23 Claims, 23 Drawing Sheets

(56) References Cited

U.S. PATENT DOCUMENTS

| | | | | |
|---|---|---|---|---|
| 7,475,894 | B2* | 1/2009 | Hodge | B60G 21/05 |
| | | | | 280/124.156 |
| 7,581,740 | B1* | 9/2009 | Stimely | B60G 17/021 |
| | | | | 280/124.136 |
| 8,480,106 | B1* | 7/2013 | Cohen | B60G 17/005 |
| | | | | 280/5.502 |
| 8,579,308 | B2* | 11/2013 | Weeks | B60G 3/20 |
| | | | | 280/124.109 |
| 8,733,768 | B1* | 5/2014 | Shoulders | B60G 7/02 |
| | | | | 280/86.757 |
| 8,814,185 | B2* | 8/2014 | Luttinen | B60G 17/015 |
| | | | | 280/86.758 |
| 8,851,209 | B2* | 10/2014 | Fukumoto | B62D 55/10 |
| | | | | 180/9.26 |
| 8,851,484 | B2* | 10/2014 | Dantzie | B60G 7/008 |
| | | | | 280/124.121 |
| 9,162,705 | B2* | 10/2015 | Aldrich | B60G 9/02 |
| 9,180,735 | B2* | 11/2015 | Tipton | B60B 35/005 |
| 10,150,342 | B2* | 12/2018 | Graeuler | B60G 3/202 |
| 10,633,021 | B2* | 4/2020 | Gordon | B60B 3/16 |
| 10,981,425 | B1* | 4/2021 | Compton | B60G 3/185 |
| 11,104,195 | B2* | 8/2021 | Stieglitz | B60G 7/001 |
| 2006/0017256 | A1* | 1/2006 | Hupperich, Jr. | B60G 9/00 |
| | | | | 280/124.156 |
| 2014/0062049 | A1 | 3/2014 | Bandy | |
| 2020/0086703 | A1* | 3/2020 | Johnson | H01R 13/005 |
| 2022/0032722 | A1* | 2/2022 | Smith | B60G 21/0553 |

FOREIGN PATENT DOCUMENTS

| | | | |
|---|---|---|---|
| DE | 102014010648 | A1 | 1/2015 |
| EP | 2141035 | A1 | 1/2010 |
| JP | 3182081 | U | 3/2001 |

OTHER PUBLICATIONS

Website of Tin Soldier Racecars; Title: Small Tire HD 4 Link Brackets; https://tinsoldierracecars.com/products/small-tire-hd-4-link-brackets Date of Access/Retrieval: Jan. 29, 2021.

Website of Outcast Autoworks; Title: Outcast autoworks f-100/f-series heavy duty parallel 4 bar rear suspension brackets only no link bars; https://www.outcastautoworks.com/products/outcast-autoworks-heavy-duty-parellel-4-bar-rear-suspension Date of Access/Retrieval: Jan. 29, 2021.

Website of Chris Duncan Race Cars; Title: CDRC suspension; http://chrisduncanracecars.com/cdrc-suspension/ Date of Access/Retrieval: Jan. 29, 2021.

Website of FAB Quest Uncommon Performance Parts!; Title: Universal Rear Pro Street Adjustable 4 Link kit; https://www.fabquest.com/universal-pro-street-4-link-kit.html Date of Access/Retrieval: Jan. 29, 2021.

Website of Progressive Automotive; Title: Parallel 4-bar & panhard bar rear suspension; https://www.progressiveautomotive.com/installations-kits-parts/rear-suspensions/parallel-4-bar-rear-suspension.html Date of Access/Retrieval: Jan. 29, 2021.

Website of Tim McAmis Performance Parts catalog; https://timmcamis.com/shop/4-link-suspension-system.html Date of Access/Retrieval: Jan. 29, 2021.

Website of Quarter-Max Chassis & Racing Components; https://quartermax.com/extreme-adjustable-billet-4-link-chassis-brackets-kit/Date of Access/Retrieval: Jan. 29, 2021.

Website of Andy McCoy Race Cars; https://andymccoyracecars.com/product/amrc-billet-adjustable-4-link-kit/ Date of Access/Retrieval: Jan. 29, 2021.

Website of Team Z Motorsports, Inc.; http://www.teamzmotorsports.net/product_p/tzm-b4lcb.htm Date of Access/Retrieval: Jan. 29, 2021.

Website of Tim McAmis Performance Parts; https://timmcamis.com/shop/chassis/rear-end-housings/modular-housings.html Date of Access/Retrieval: Jan. 29, 2021.

Website of Strange Engineering; https://www.strangeengineering.net/product-category/drag-racing-rear-ends/9-inch-modular-housing/ Date of Access/Retrieval: Jan. 29, 2021.

Website of Mark Williams Enterprises, Inc.; https://www.markwilliams.com/modular-housings.html Date of Access/Retrieval: Jan. 29, 2021.

* cited by examiner

BRACKET ASSEMBLY FOR A MULTI-LINK SUSPENSION SYSTEM

CROSS-REFERENCES TO RELATED APPLICATIONS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE DISCLOSURE

The present disclosure relates generally to a suspension system, and more particularly to an adjustable bracket assembly for a multi-link suspension system for an automotive vehicle.

BACKGROUND

Within the automotive industry, and especially within the automotive racing industry, there are a number of suspension systems that are utilized. These suspension systems include, but are not limited to, four-link suspension systems, three-link suspension systems, and ladder-bar suspension systems. A suspension system, whether it is a four-link suspension system, a three-link suspension system, or a ladder-bar suspension system, is the industry standard for those automotive vehicles designed and engineered for high-performance, such as drag-racing vehicles.

Within the automotive industry, particularly for high-performance vehicular applications, there is an ongoing need for multi-link suspension systems that provide a greater number of instant center (I/C) points. The I/C, or instantaneous center, is defined as the point on a rigid body, the point of which has a zero velocity (m/s) at a given instant. Within the context of automotive vehicles, the instant center is an imaginary point, as determined as the center of radius for a moving multi-link suspension system. This imaginary point may be the point of lift, either in a positive or negative direction, as defined the pertinent coordinate system. In the multi-link suspension system, the instant center is the intersecting point of trailing arms, if the trailing arms were to be infinitely extended. The intersecting point may be changed by raising or lowering mounting points for trailing arms. By changing the imaginary point in relation to an automotive vehicle's center of gravity, it may be determined how much force (N) is applied to the tires of the automotive vehicle; the higher the instant center, the greater the force applied to the tires of the vehicle, and the lower the instant center, the lesser the force applied to the tires of the automotive vehicle.

Determining the I/C of a multi-link suspension system is instrumental in determining the anti-squat (AS) of the multi-link suspension system. The AS effect is a maximization of the multi-link suspension system, which optimizes an automotive vehicle's ability to apply a force to a surface of a road. When the force is applied through the multi-link suspension system, a rear end of the automotive vehicle pushes in an upward direction, rather than pushing down, or "squatting," under the force.

To achieve a range of instant center points, one or more bracket assemblies are mounted to the chassis, or frame, of the vehicle, the one or more bracket assemblies having a number of mounting points for trailing arms. These bracket assemblies in current suspension systems, such as four-link suspension systems, three-link suspension systems, and ladder-bar suspension systems, provide a range of instant center locations, and allow for an alignment of the rear of the vehicle to the centerline of the vehicle, an adjustment of load, and a change of pinion angle.

While current suspension systems provide the foregoing advantages, they are still limited and problematic. Typical suspension systems range from providing no adjustability as to the I/C point, to providing little adjustability by way of mounting points with five-eighths-of-an-inch (⅝") to three-fourths-of-an-inch (¾") increments. While the latter permits some degree of configuration, the tuneability of a suspension system is limited by steps of sizeable increments. Other suspension systems, such as chassis-mounted bracket systems, may offer adjustability by way of mounting points with one-eighth-of-an-inch (⅛") adjustability, thereby increasing the tunability of an I/C point with more incremental steps. Chassis-mounted brackets, however, are disadvantageous for a number of reasons.

Chassis-mounted bracket assemblies are limited insofar as they only provide instant center adjustability, due to the configuration of the mounting points for trailing arms. Where a chassis-mounted bracket is incorporated into a suspension system, a determination as to the instant center points is limited and constrained to those identifiable mounting points on the chassis-mounted bracket. This is particularly problematic as chassis-mounted bracket assemblies are often fixedly installed on the frame of the vehicle, such that the chassis-mounted bracket cannot be positionally relocated for change of instant center points along and across the mounting points for the trailing arms on the chassis-mounted bracket.

Another drawback associated with chassis-mounted bracket assemblies is that the chassis-mounted bracket assemblies often installed on the frame of the vehicle, leaving the chassis-mounted bracket assemblies to remain on the vehicle for the remainder of frame's life, unless and until the chassis of the vehicle is re-manufactured or otherwise reconstructed. This is particularly detrimental for vehicles utilized for high-performance applications, such as drag-racing vehicles, where the tunability or adjustability of an instant center point may need to be changed or altered prior to, or during, a race or performance of the vehicle having the chassis-mounted bracket assembly.

In addition to the limitation as to adjustability and tunability, chassis-mounted bracket assemblies are strictly limited to the configuration, or reconfiguration, of mounting points for trailing arms. Chassis-mounted bracket assemblies provide no additional adjustability as it relates to other components in a vehicle's suspension system, including such components as anti-roll bars, shock mounts, and shock absorbers. As such, a chassis-mounted bracket assembly lacks versatility in a suspension system, which is needed within the industry of suspension systems for vehicles, particularly those utilized for high-performance applications, such as drag-racing.

In light of the foregoing limitations of chassis-mounted bracket assemblies in suspension systems, it would be desirable to provide modularity, tunability, adjustability, and removability of a bracket assembly, by moving the bracket assembly away from the chassis, or frame of the vehicle, and mounting said bracket assembly on the housing of a vehicle.

BRIEF SUMMARY

The current disclosure provides a novel bracket assembly for a multi-link suspension system, said bracket assembly mounted to a housing of an automotive vehicle, as opposed to a chassis, or a frame, of the automotive vehicle.

In the context of a bracket assembly for a multi-link suspension system, the current disclosure provides a bracket assembly mounted to a housing of an automotive vehicle, as opposed to a chassis, or a frame, of the automotive vehicle, enabling ease of replacement of the housing and adjustability of suspensions system components, such as at least one trailing arm, an anti-roll bar, a shock absorber coupler, or a shock absorber.

The current disclosure provides a bracket assembly mounted to a housing of an automotive vehicle, enabling adjustability of the instant center (I/C) point in the order of over one thousand I/C locations.

The current disclosure provides a bracket assembly mounted to a housing of an automotive vehicle, the bracket assembly of which supports geometrical configurations for vehicles having small- or big-tire combinations, or radial- or drag-slick tire combinations.

The current disclosure further provides a bracket assembly mounted to a housing of an automotive vehicle, offering adjustability of the mounting points of at least one trailing arm in steps at least as fine as one-eighth-of-an-inch (⅛") increments. The current disclosure sets forth a bracket assembly mounted to a housing of an automotive vehicle, wherein an adjustable shock absorber coupler may be adjusted in steps at least as fine one-half-of-an-inch (½") increments. The current disclosure sets forth a bracket assembly mounted to a housing of an automotive vehicle, wherein an anti-roll bar may be adjusted in steps at least as fine as one-half-of-an-inch (½") increments.

In the context of a bracket assembly for a multi-link suspension system, said bracket assembly may be mounted to a housing of an automotive vehicle, such as a rear, differential housing. The housing of the automotive vehicle may include a number of housing components, such as a differential cage, one or more axle tubes, and/or one or more cross tubes. The bracket assembly may have a body, wherein the body includes: an axle tube hole; one or more cross tube support holes; at least one trailing arm attachment portion having a first plurality of adjustment holes and a second plurality of adjustment holes; an anti-roll bar attachment portion having one or more attachment holes; and a shock attachment portion having a plurality of attachment holes. Further, the bracket assembly may include one or more engagement points, configured to support a number of suspension system components, such as at least one trailing arm, an anti-roll bar, a shock mount, and a shock absorber.

In the context of a bracket assembly for a multi-link suspension system, said bracket assembly may be mounted to a housing of an automotive vehicle, such as a rear, differential housing. The housing of the automotive vehicle may include a number of housing components, such as a differential cage, one or more axle tubes, and one or more cross tubes. The bracket assembly may have a body, said body having a plurality of body layers. Said body having a plurality of body layers may further include: an axle tube hole; one or more cross tube support holes; at least one trailing arm attachment portion having a first plurality of adjustment holes and a second plurality of adjustment holes; an anti-roll bar attachment portion having one or more attachment holes; and a shock attachment portion having a plurality of attachment holes. Further, the bracket assembly may include one or more engagement points, configured to support a number of suspensions system components, such as at least one trailing arm, an anti-roll bar, a shock amount, and a shock absorber.

In one particular and exemplary embodiment, a bracket assembly for a multi-link suspension system is provided, wherein said bracket assembly is configured to couple a housing to an automotive vehicle, said housing having a differential cage and one or more axle tubes. The bracket assembly has a body, said body having a first exterior body surface and a second exterior body surface, the first exterior body surface parallel to the second exterior body surface. The body of the bracket assembly includes an axle tube hole defined between the first exterior body surface and the second exterior body surface, the axle tube hole configured to receive one of the one or more axle tubes. The body of the bracket assembly further includes at least one trailing arm attachment portion having first plurality of adjustment holes and a second plurality of adjustment holes, the first plurality of adjustment holes and the second plurality of adjustment holes defined between the first exterior body surface and the second exterior body surface. The body of the bracket assembly further includes an anti-roll bar attachment portion having one or more attachment holes defined between the first exterior body surface and the second exterior body surface. The body of the bracket assembly further includes a shock attachment portion having a plurality of attachment holes defined between the first exterior body surface and the second exterior body surface.

In one aspect according to the above-referenced embodiment, each of the at least one trailing arm attachment portion, the anti-roll bar attachment portion, and the shock attachment portion of the body of the bracket assembly may be integrally formed.

In another embodiment, the body of the bracket assembly may further comprise one or more cross tube support holes defined between the first exterior body surface and the second exterior body surface. Each of the one or more cross tube support holes may be configured to receive one of at least one cross tube.

In another embodiment, the body of the bracket assembly may further comprise one or more lightening pockets, the one or more lightening pockets recessed in at least one of the first exterior body surface or the second exterior body surface.

In another embodiment, the body of the bracket assembly may further comprise a plurality of cage holes defined between the first exterior body surface and the second exterior body surface and disposed around the axle tube hole, said plurality of cage holes positioned to align with a plurality of endbell holes disposed about the differential cage of the housing.

In another embodiment, the body of the bracket assembly may include at least one recessed channel defined in at least one of the first exterior body surface or the second exterior body surface of the body. The second plurality of adjustment holes of the trailing arm attachment portion of the body may be positioned within the at least one recessed channel.

In another embodiment, the body of the bracket assembly may further comprise an upper portion and a lower portion, and the at least one trailing arm attachment portion may include a first trailing arm attachment portion and a second trailing arm attachment portion. The upper portion may contain the first trailing arm attachment portion and the lower portion may contain the second trailing arm attachment portion.

In another embodiment, at least one trailing arm bracket may be couplable to the at least one trailing arm attachment portion of the body of the bracket assembly, wherein the at least one trailing arm bracket may include a first plurality of trailing arm bracket holes, a second plurality of trailing arm bracket holes, and a third plurality of trailing arm bracket holes. At least one hole of the second plurality of trailing arm bracket holes may be configured to align with a corresponding at least one hole of the first plurality of adjustment holes of the at least one trailing arm attachment portion, when one of the third plurality of trailing arm bracket holes aligns with a corresponding one of the second plurality of adjustment holes of the at least one trailing arm attachment portion.

In one aspect according to the above-referenced embodiment, the third plurality of trailing arm bracket holes may be defined through a laterally elongated protrusion of the at least one trailing arm bracket. The laterally elongated protrusion may be configured to be slidably received in a recessed channel of the body of the bracket assembly in which the second plurality of adjustment holes of the at least one trailing arm attachment portion are positioned.

In one aspect according to the above-referenced embodiment, one or more of the first plurality of trailing arm bracket holes may be configured to receive a trailing arm, so as to selectively position the trailing arm relative to the body of the bracket assembly.

In another embodiment, the one or more attachment holes of the anti-roll bar portion may be recessed in the body relative to at least one of the first exterior body surface or the second exterior body surface.

In another embodiment, at least one anti-roll bar bracket may include a first plurality of anti-roll bar bracket holes and a second plurality of anti-roll bar bracket holes. The first plurality of anti-roll bar bracket holes may be configured to align with the one or more attachment holes of the anti-roll bar attachment portion of the body.

In one aspect according to the above-referenced embodiment, one or more of the second plurality of anti-roll bar bracket holes may be configured to receive an anti-roll bar, so as to selectively position the anti-roll bar relative to the body of the bracket assembly.

In one aspect according to the above-referenced embodiment, the anti-roll bar attachment portion may further include at least one anti-roll bar attachment portion recess defined in at least one of the first exterior body surface or the second exterior body surface. The at least one anti-roll bar attachment portion recess may be configured to receive the at least one anti-roll bar bracket.

In one aspect according to the above-referenced embodiment, the at least one anti-roll bar bracket may include a first anti-roll bar bracket portion and a second anti-roll bar bracket portion, the first anti-roll bar bracket portion positionable closer to the first exterior body surface than to the second exterior body surface, and the second anti-roll bar bracket portion positionable closer to the second exterior body surface than to the first exterior body surface. Each hole of the first and second pluralities of anti-roll bar bracket holes may be defined through the first and second anti-roll bar bracket portions.

In another embodiment, at least one shock absorber bracket may include a first plurality of shock absorber bracket holes and a second plurality of shock absorber bracket holes. The first plurality of shock absorber bracket holes may be configured to align with the plurality of attachment holes of the shock attachment portion of the body of the bracket assembly.

In one aspect according to the above-referenced embodiment, a shock absorber may be selectively coupled to one or more of the second plurality of shock absorber bracket holes, so as to selectively position the shock absorber coupler relative to the body of the bracket assembly.

In one aspect according to the above-referenced embodiment, the at least one shock absorber bracket may include a first shock absorber bracket portion positionable along the first exterior body surface and a second shock absorber bracket portion positionable along the second exterior body surface, and each hole of the first and second pluralities of shock absorber bracket holes may be defined through the first and second shock absorber bracket portions.

In another embodiment, the body of the bracket assembly may further comprise a plurality of body layers defined between the first exterior body surface and the second exterior body surface.

In one aspect according to the above-referenced embodiment, at least two of the plurality of body layers may define the first exterior body surface and the second exterior body surface, respectively.

In one aspect according to the above-referenced embodiment, one or more lightening pockets may be defined at least partially through at least one of the plurality of body layers.

In one aspect according to the above-referenced embodiment, at least one trailing arm doubler having a plurality of doubler holes may be positioned against at least one trailing bracket to respectively align the plurality of doubler holes with a first plurality of trailing arm bracket holes of the at least one trailing arm bracket.

In one aspect according to the above-referenced embodiment, at least one anti-roll bar spacer having a plurality of spacer holes may be positioned against at least one anti-roll bar bracket to respectively align the plurality of spacer holes with a plurality of anti-roll bar bracket holes of the at least one anti-roll bar bracket.

Unless otherwise defined, all technical and scientific terms used herein have the same meaning as commonly understood by one of ordinary skill in the art to which this invention belongs. The present invention may be embodied in other specific forms without departing from the spirit or essential attributes thereof, and it is therefore desired that the present embodiment be considered in all aspects as illustrative and not restrictive. Any headings utilized in the description are for convenience only and no legal or limiting effect. Numerous objects, features, and advantages of the embodiments set forth herein will be readily apparent to those skilled in the art upon reading of the following disclosure when taken in conjunction with the accompanying drawings.

DETAILED DESCRIPTION

Figure 1A:
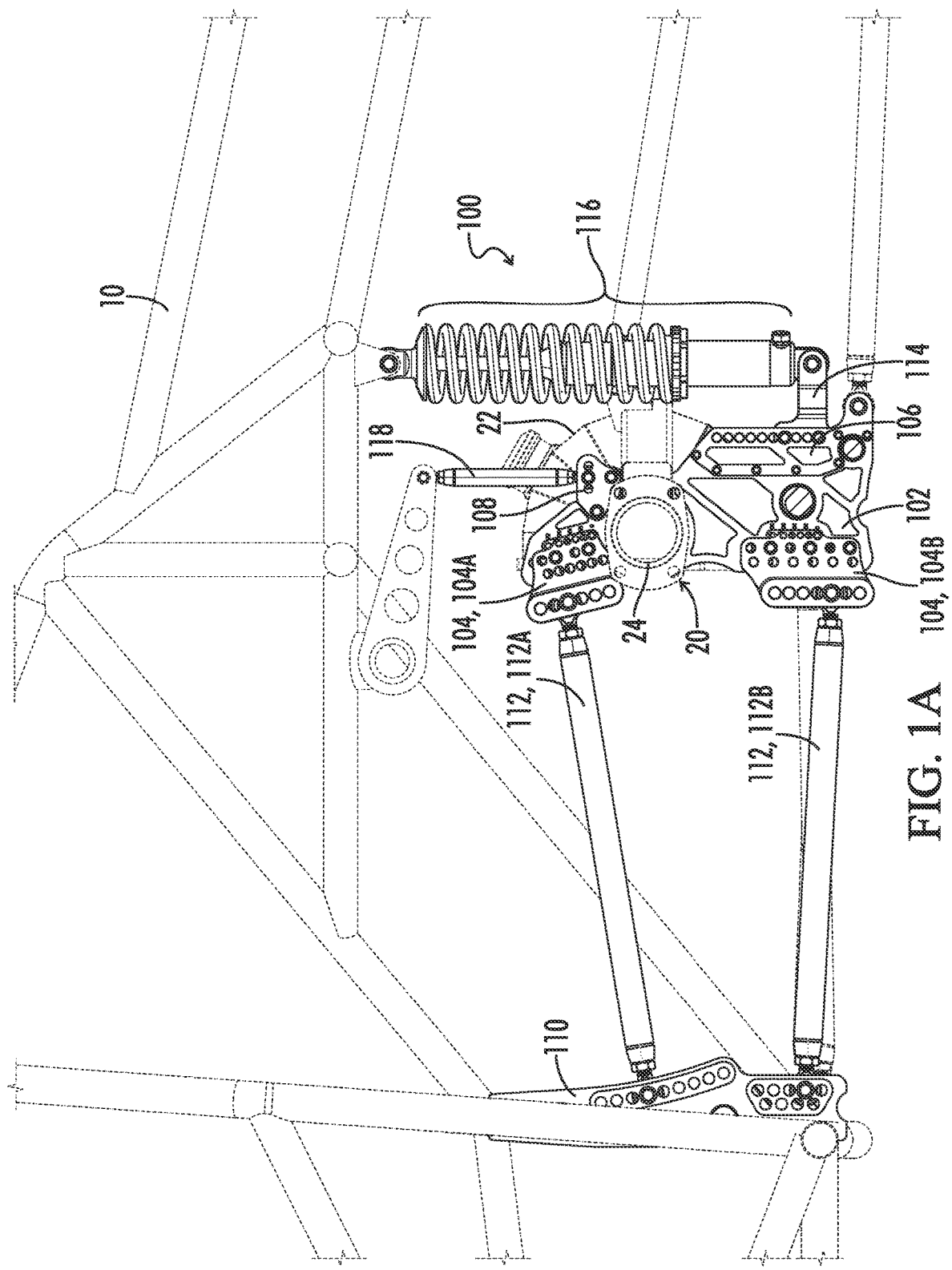
FIG. 1A is a side-perspective view of a bracket assembly, an automotive vehicle chassis, and a housing in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "coupled," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1A-2B, a bracket assembly 100 for a multi-link suspension system is shown. The bracket assembly 100 is mounted to an axle housing 20 of an automotive vehicle chassis 10 (shown in FIGS. 1A and 1B). The axle housing 20 may also be referred to herein as a housing 20. The housing 20 includes a differential cage 22 and one or more axle tubes 24. The housing 20 may be removable from or modularly replaceable with the automotive vehicle chassis 10. The bracket assembly 100 is highly adjustable, allowing a trailing arm 112, an anti-roll bar 118, and a shock absorber coupler 114 to be selectively moved relative to the housing 20 in specified increments, for example, increments as fine as at least one-half-of-an-inch (½"), or one-eighth-of-an-inch (⅛"). The adjustability of the bracket assembly 100 provides thousands of instant center multi-link suspension system combinations. The bracket assembly 100 may be applicable to both a rear differential housing and a front differential housing; the present disclosure, however, illustrates the rear differential housing.

The bracket assembly 100 comprises a body 102. The bracket assembly 100 may further comprise the at least one trailing arm bracket 104, a shock absorber bracket 106, and an anti-roll bar bracket 108. Each of the at least one trailing arm bracket 104, the shock absorber bracket 106, and the anti-roll bar bracket 108 is couplable to the body 102.

Figure 1B:
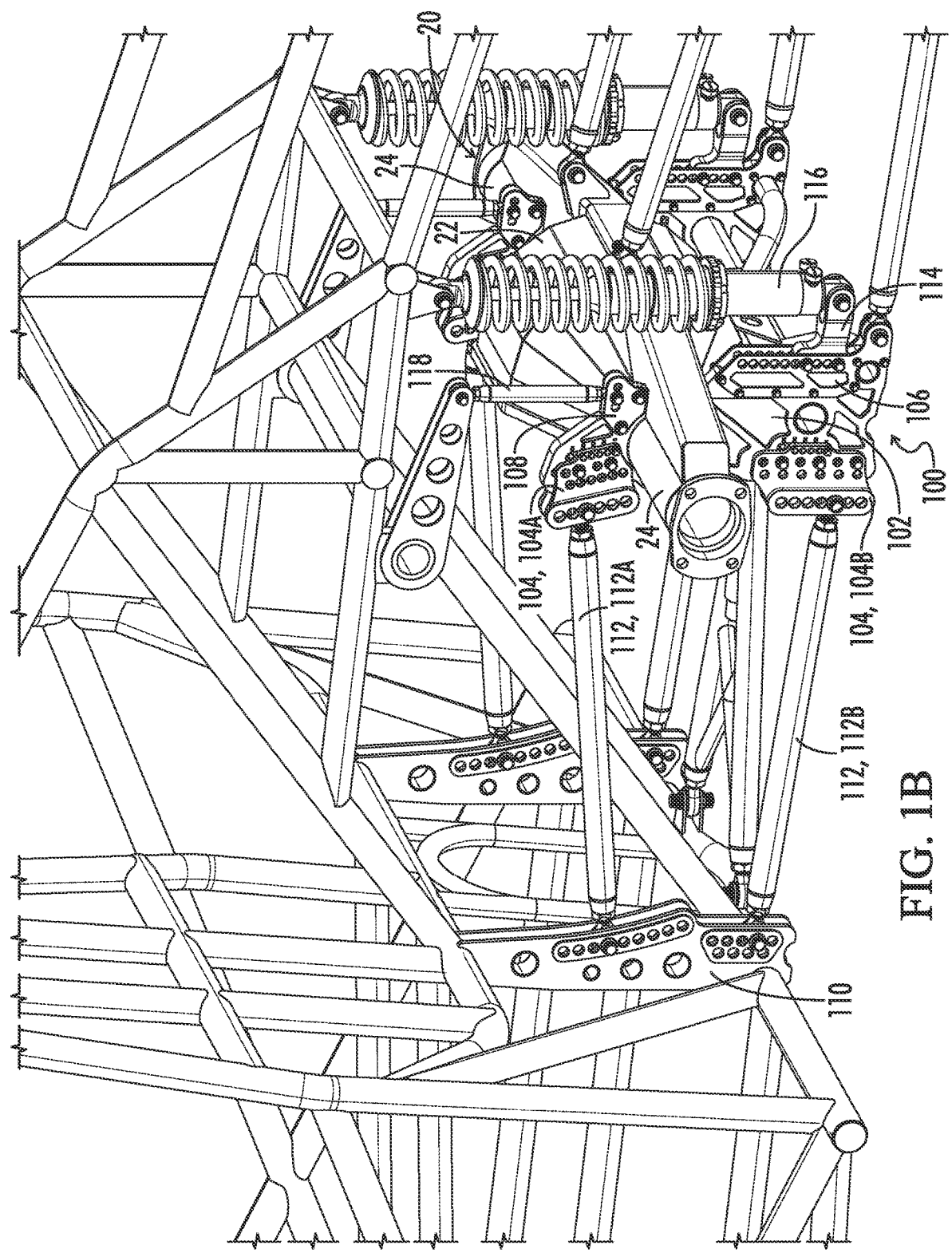
FIG. 1B is a perspective view of the bracket assembly, the automotive vehicle chassis, and the housing of FIG. 1A in accordance with the present disclosure.

The bracket assembly 100 may further include a chassis-mounted bracket 110 couplable to the automotive vehicle chassis 10. The trailing arm 112 is configured to be coupled between the chassis-mounted bracket 110 and each of the at least one trailing arm bracket 104. As illustrated in FIGS. 1A-1B, the at least one trailing arm bracket 104 includes a first trailing arm bracket 104A and a second trailing arm bracket 104B. A first trailing arm 112A is coupled between the chassis-mounted bracket 110 and the first trailing arm bracket 104A. A second trailing arm 112B is coupled between the chassis-mounted bracket 110 and the second trailing arm bracket 104B. The first trailing arm bracket 104A may also be referred to herein as an upper trailing arm bracket 104A. The second trailing arm bracket 104B may also be referred to herein as a lower trailing arm bracket 104B.

The bracket assembly 100 may further include a shock absorber coupler 114 couplable to the shock absorber bracket 106. The shock absorber coupler 114 may be adjustable, as depicted in FIGS. 1A-4B, 4D-7C or alternatively, non-adjustable or fixed, as depicted in FIG. 4C. A shock absorber 116 is configured to be coupled between the shock absorber coupler 114 and the automotive vehicle chassis 10. An anti-roll bar 118 is configured to be coupled between the anti-roll bar bracket 108 and the automotive vehicle chassis 10.

The body 102 of the bracket assembly 100 includes at least one trailing arm attachment portion 120, a shock attachment portion 122, and an anti-roll bar attachment portion 124. The at least one trailing arm bracket 104 is configured to be coupled to the at least one trailing arm attachment portion 120 of the body 102. In certain optional embodiments, the first trailing arm bracket 104A is configured to be coupled to a first trailing arm attachment portion 120A of the body 102, and the second trailing arm bracket 104B is configured to be coupled to a second trailing arm attachment portion 120B of the body 102. The shock absorber bracket 106 is configured to be coupled to the shock attachment portion 122 of the body 102. The anti-roll bar bracket 108 is configured to be coupled to the anti-roll bar attachment portion 124 of the body 102. The first trailing arm attachment portion 120A may also be referred to herein as an upper trailing arm attachment portion 120A, and the second trailing arm attachment portion 120B may also be referred to herein as a lower trailing arm attachment portion 120B.

Figure 2A:
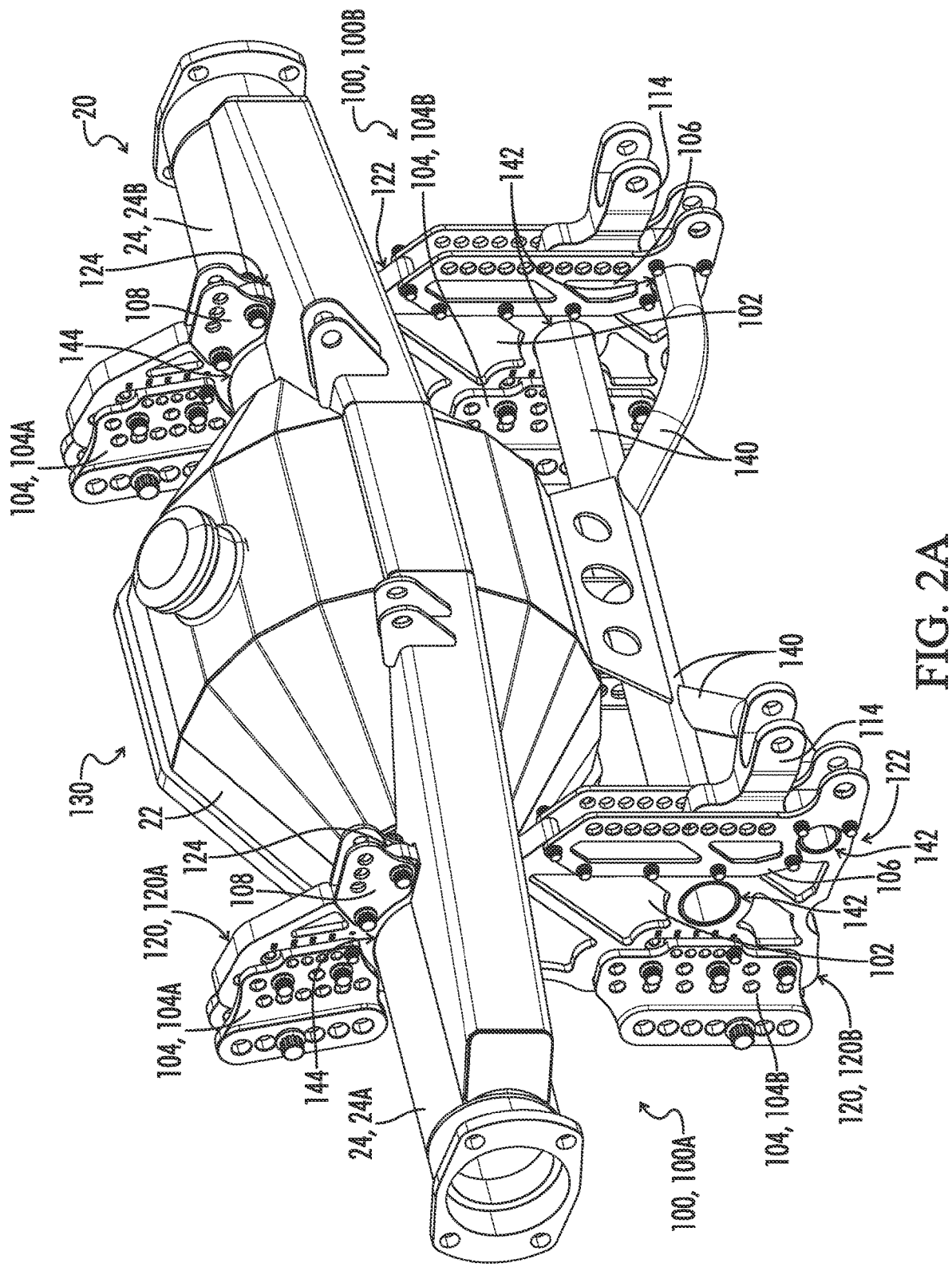
FIG. 2A is a perspective view of the bracket assembly of FIG. 1A installed on the housing in accordance with the present disclosure.
Figure 2B:
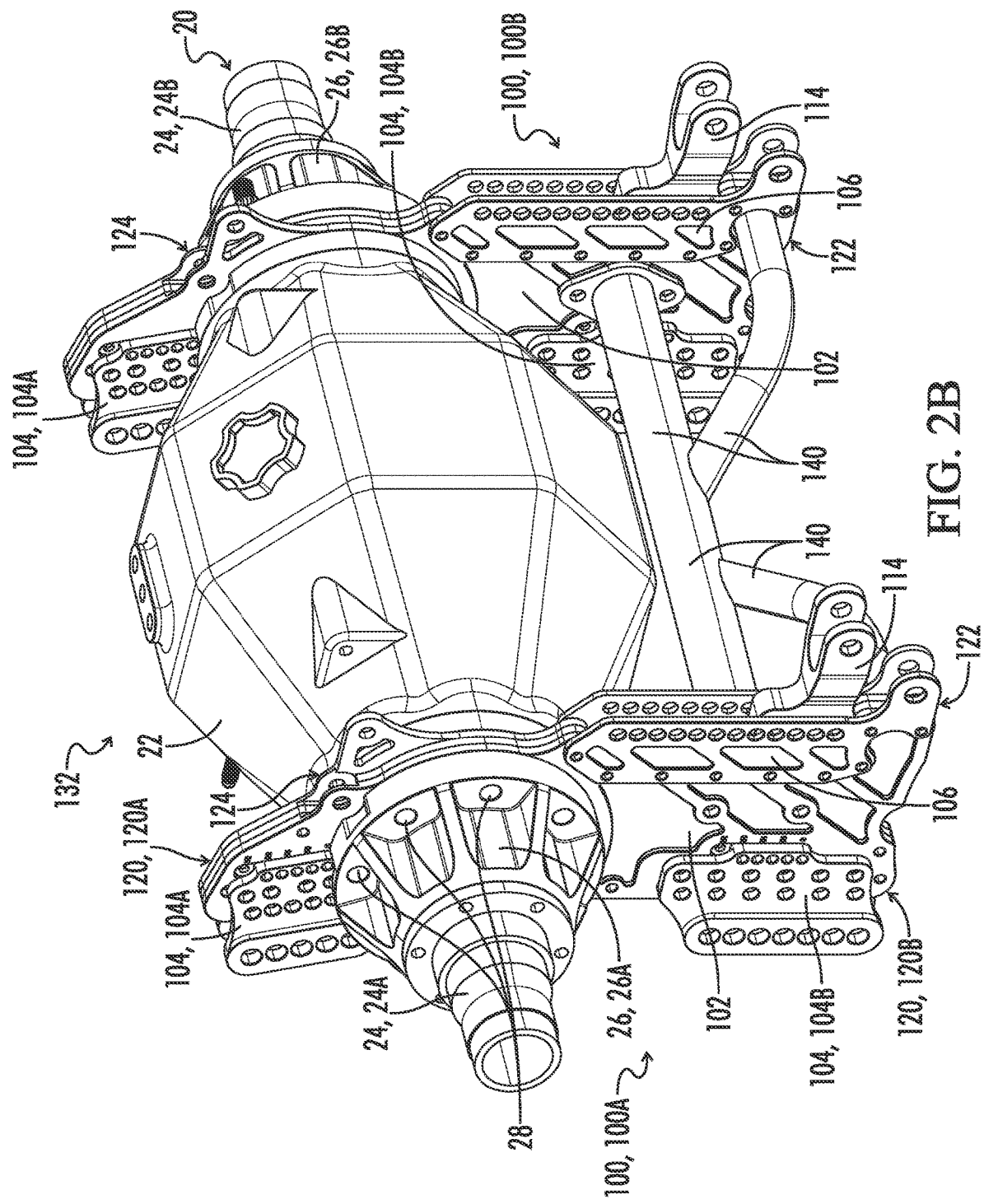
FIG. 2B is a perspective view of an embodiment of the bracket assembly of FIG. 2A installed on the housing in accordance with the present disclosure.
Figure 2C:
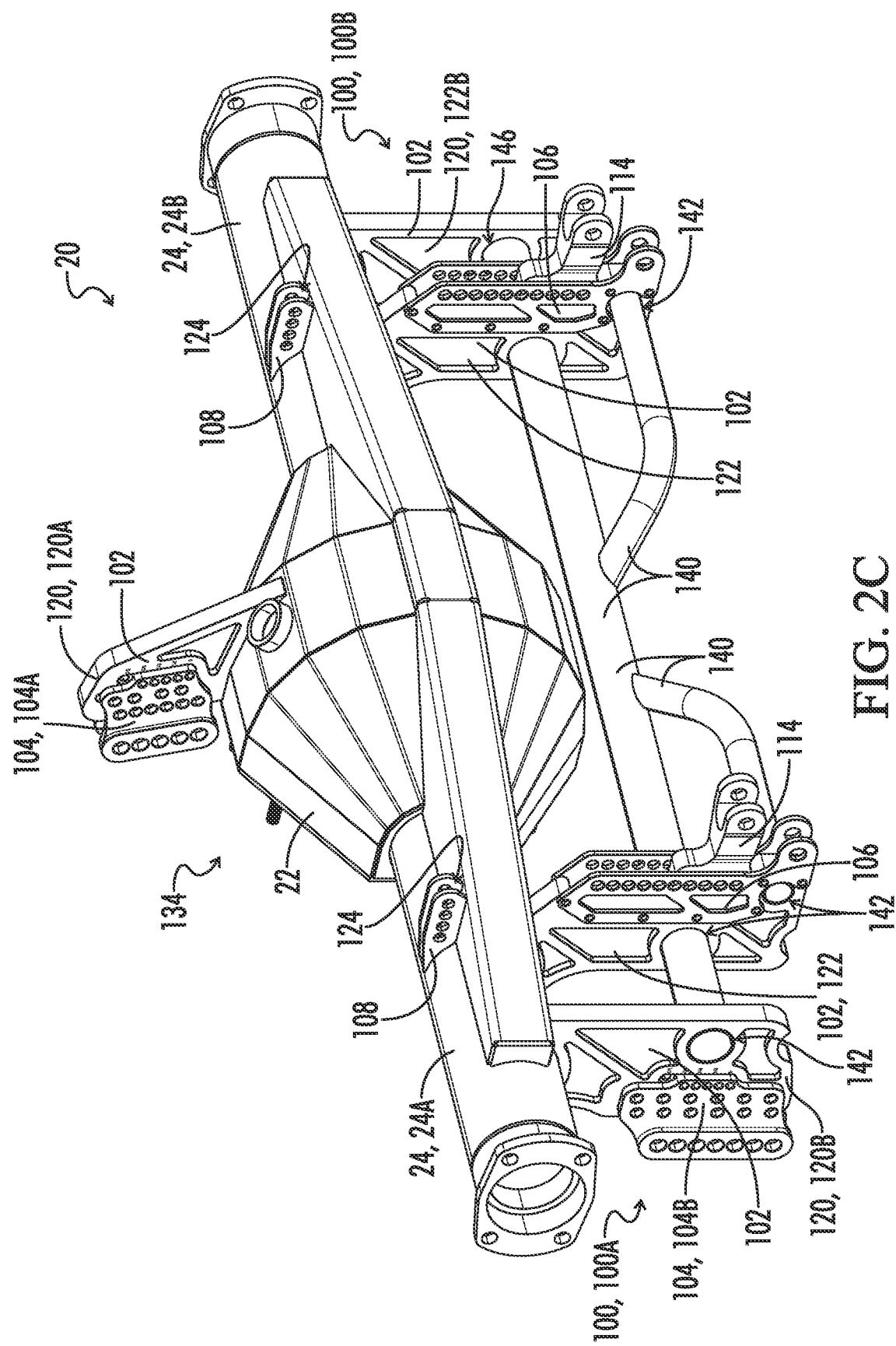
FIG. 2C is a perspective view of another embodiment of the bracket assembly of FIG. 2A installed on the housing in accordance with the present disclosure.

Referring to FIGS. 2A-2C, the bracket assembly 100 is shown in combination with the housing 20 according to various multi-link suspension systems. According to a first multi-link suspension system 130, as illustrated in FIG. 2A, the body 102 of the bracket assembly 100 is welded to the housing 20, and is arranged in accordance with a four-link suspension system. Additionally, the body 102 including each of the at least one trailing arm attachment portion 120, the shock attachment portion 122, and the anti-roll bar attachment portion 124 of the body 102 is integrally formed. The first multi-link suspension system 130 features a first bracket assembly 100A coupled to a first axle tube 24A of the one or more axle tubes 24 and a second bracket assembly 100B coupled to a second axle tube 24B of the one or more axle tubes 24. For simplicity, similar elements of the first bracket assembly 110A and the second bracket assembly 100B may be numbered similarly to those of the bracket assembly 100, as disclosed above. One or more cross tubes 140 may be coupled between a respective body 102 of the first bracket assembly 100A and a respective body 102 of the second bracket assembly 100B. As illustrated, the one or more cross tubes 140 are welded to the first bracket assembly 100A and the second bracket assembly 100B. In certain optional embodiments, the one or more cross tubes 140 may also be welded to the differential cage 22 of the housing 20.

According to a second multi-link suspension system 132, as illustrated in FIG. 2B, the body 102 of the bracket assembly 100 is bolted to an endbell 26 of the housing 20, and is arranged in accordance with a four-link suspension system. More specifically, the bracket assembly 100 may be installed between the endbell 26 and the differential cage 22 of the housing 20. The endbell 26 includes a plurality of endbell holes 28 disposed about the endbell 26 and optionally extending into the differential cage 22. Additionally, the body 102 including each of the at least one trailing arm attachment portion 120, the shock attachment portion 122, and the anti-roll bar attachment portion 124 of the body 102 is integrally formed. The second multi-link suspension system 132 features the first bracket assembly 100A coupled to a first endbell 26A of the first axle tube 24A and the second bracket assembly 100B coupled to a second endbell 26B of the second axle tube 24B. Similar to the first multi-link suspension system 130, the second multi-link suspension system 132 features the one or more cross tubes 140 coupled between a respective body 102 of the first bracket assembly 100A and a respective body 102 of the second bracket assembly 100B. As illustrated, the one or more cross tubes 140 are bolted to the first bracket assembly 100A and the second bracket assembly 110B.

According to a third multi-link suspension system 134, as illustrated in FIG. 2C, each of the first trailing arm attachment portion 120A, the second trailing arm attachment portion 120B, and the shock attachment portion 122, and the anti-roll bar attachment portion of the body 102 may be independently formed and independently attached to the housing 20, and is arranged in accordance with a three-link suspension system. As illustrated, each of the first trailing arm attachment portion 120A, the second trailing arm attachment portion 120B, the shock attachment portion 122, and the anti-roll bar attachment portion 122 may be attached to the housing 2020 vis-á-vis welding. Each of the second trailing arm attachment portion 120B and the shock attachment portion 122 of the body 102 may be coupled to one of the first axle tube 24A or the second axle tube 24B. The first trailing arm attachment portion 120A of the body 102 may be coupled to the differential cage 22 of the housing 20 and may be a common element between the first bracket assembly 100A and the second bracket assembly 100B. The one or more cross tubes 140 may be coupled between the second trailing arm attachment portion 120B and the shock attachment portion 122 of the first bracket assembly 100A and the second trailing arm attachment portion 120B and the shock attachment portion 122 of the second bracket assembly 100B. As illustrated, the one or more cross tubes 140 are welded to the first bracket assembly 100A and the second bracket assembly 100B.

As illustrated in FIGS. 2A and 2C, the one or more cross tubes 140 may be received by one or more cross tube support holes 142 defined in the body 102 of the bracket assembly 100 prior to fastening.

As illustrated in FIG. 2B, the body 102 of the bracket assembly 100 does not include cross tube support holes (not shown) since the one or more cross tubes 140 are surface bolted thereto.

Figure 3A:
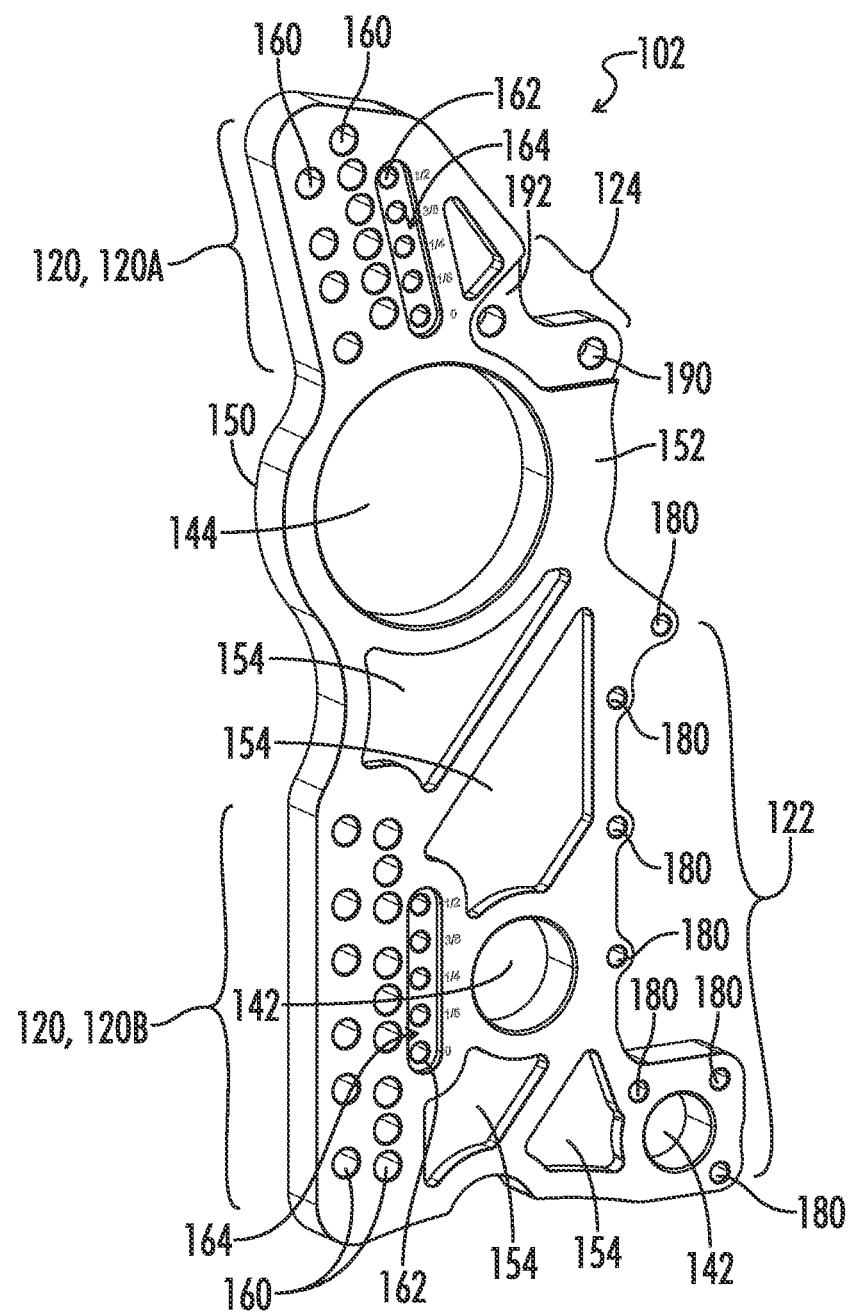
FIG. 3A is a perspective view of a body of the bracket assembly of FIG. 2A in accordance with the present disclosure.
Figure 3B:
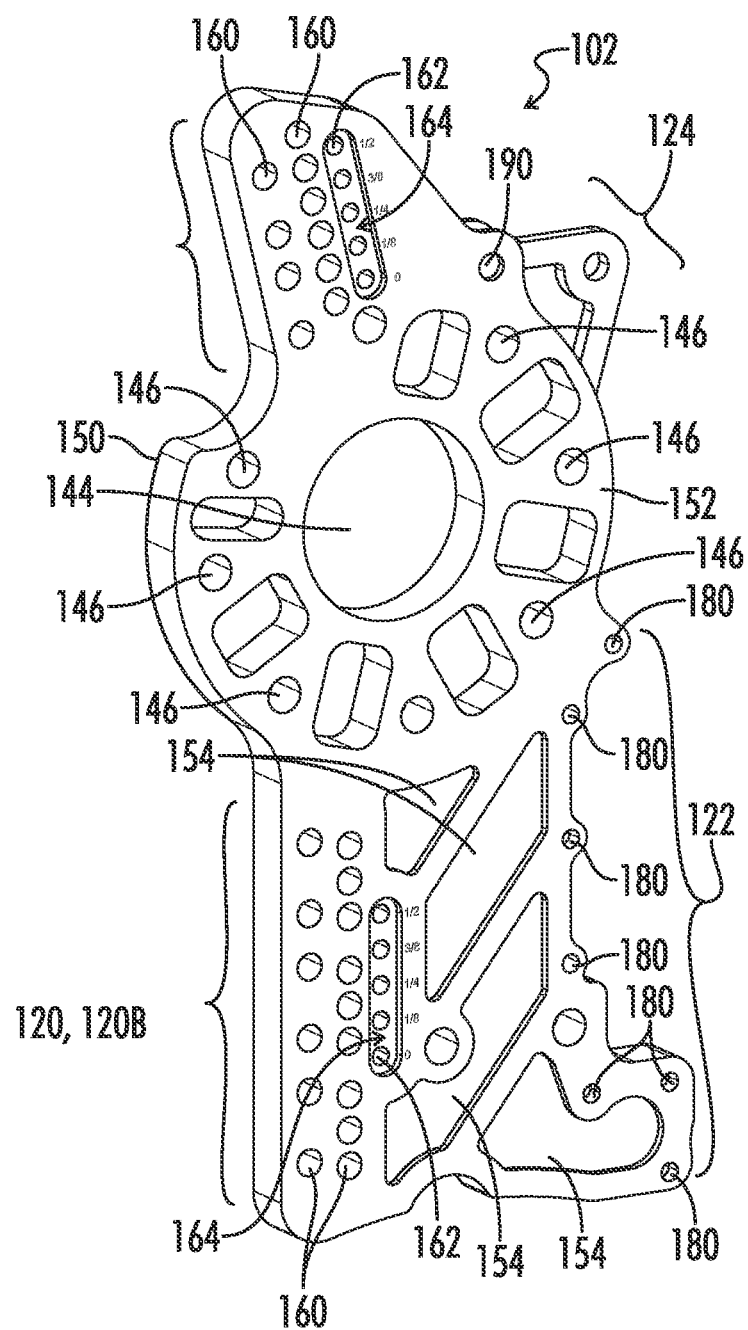
FIG. 3B is a perspective view of a body of the bracket assembly of FIG. 2B comprising a single layer body in accordance with the present disclosure.

As illustrated in FIGS. 1A-3B, the body 102 of the bracket assembly 100 further includes an axle tube hole 144 configured to receive one of the one or more axle tubes 24. The axle tube hole 144 is bored through the body 102 between a first exterior body surface 150 of the body and a second exterior body surface 152 of the body 102. The first and second exterior body surfaces 150, 152 of the body 102 may also be referred to herein as first and second exterior surfaces 150, 152 or first and second surfaces 150, 152. The body 102 may further include one or more lightening recess pockets 154 defined in at least one of the first and second exterior body surfaces 150, 152. The one or more lightening recess pockets 154 may decrease the weight of the body 102 while also increasing the strength of the body 102. As illustrated in FIG. 3B, the body 102 may further include a plurality of endbell engagement holes 146 defined through the body between the first exterior body surface 150 and the second exterior body surface 152. The plurality of endbell engagement holes 146 may be disposed about the axle tube hole 144. The disposition of the endbell engagement holes 146 about the axle tube hole 144 may be circumferential.

As illustrated in FIGS. 1A-2A and 2C-4E, the body 102 may be a single layer solid body defined between the first and second exterior body surfaces 150, 152. As illustrated in FIGS. 2B and 5A-6D, the body 102 may be comprised of multiple layers defined between the first and second exterior body surfaces 150, 152, as further discussed below. Element numbering and discussions of the features and elements of the body 102 will be consistent regardless of single or multi-layer body composition. Referring to FIG. 3A, 4A-4B, 5A-5B, and 6A-6B, detailed views of the bracket assembly 100 and/or the body 102 of bracket assembly 100 consistent with the first multi-link suspension system 130 (FIG. 2A) are shown. Referring to FIG. 3B, 4D-4E, 5C-5D, and 6C-6D, detailed views of the bracket assembly 100 and/or the body 102 of bracket assembly 100 consistent with the second multi-link suspension system 132 (FIG. 2B) are shown.

The at least one trailing arm attachment portion 120 of the body 102 includes a first plurality of adjustment holes 160 and a second plurality of adjustment holes 162. Each of the first plurality of adjustment holes 160 may have a first diameter and a first depth. Each of the second plurality of adjustment holes 162 may have a second diameter and a second depth. In certain optional embodiments, the first diameter may be greater than the second diameter. The first plurality of adjustment holes 160 may be divided into two columns, each with a different spacing between respective holes.

As shown in FIGS. 3A-3B, 4B, 4E, 5C-5D, and 6D, the at least one trailing arm attachment portion 120 of the body 102 may further include at least one recessed channel 164 defined in one or more of the first exterior body surface 150 of the second exterior body surface 152. The second plurality of adjustment holes 162 of the at least one trailing arm attachment portion 120 of the body 102 may be positioned within the at least one recessed channel 164 such that the second depth is less than the first depth of the first plurality of adjustment holes 160. In certain optional embodiments, the at least one recessed channel 164 includes a first recessed channel defined in the first exterior body surface 150 of the body 102 and a second recessed channel defined in the second exterior body surface 152 of the body 102, said first recessed channel aligned with the first recessed channel. The second plurality of adjustment holes 162 may be positioned between the first recessed channel and the second recessed channel.

As shown in FIGS. 4A-4E and 6A-6D, the at least one trailing arm bracket 104 may be couplable to the at least one trailing arm attachment portion 120. Each of the at least one trailing arm bracket 104 may include a first trailing arm bracket portion 166 positioned along the first exterior body surface 150 and a second trailing arm bracket portion 168 positioned along the second exterior body surface 152. Each of the first and second trailing arm bracket portions 166, 168 may be identical to each other and/or may be mirror images of each other. The first and second trailing arm bracket portions 166, 168 may be aligned with each other on opposite sides of the body 102. The at least one trailing arm bracket 104 may include a first plurality of trailing arm bracket holes 170, a second plurality of trailing arm bracket holes 172, and a third plurality of trailing arm bracket holes 174. Each hole of the first, second, and third pluralities of trailing arm bracket holes 170, 172, 174 may span through the aligned first and second trailing arm bracket portions 166, 168.

The position of the at least one trailing arm bracket 104 relative to the at least one trailing arm attachment portion 120 of the body 102 may be adjustable depending upon an alignment between the second and third pluralities of trailing arm bracket holes 172, 174 with the first and second pluralities of adjustment holes 160, 162, respectively, of the at least one trailing arm attachment portion 120 of the body 102.

The second plurality of trailing arm bracket holes 172 may be divided into two columns, each with a different spacing between respective holes, similar to the first plurality of adjustment holes 160 of the at least one trailing arm attachment portion 120 of the body 102. At least one hole of the second plurality of trailing arm bracket holes 172 may be configured to align with a corresponding at least one hole of the first plurality of adjustment holes 160 when one of the third plurality of trailing arm bracket holes 174 aligns with a corresponding one of the second plurality of adjustment holes 162.

Figure 7A:
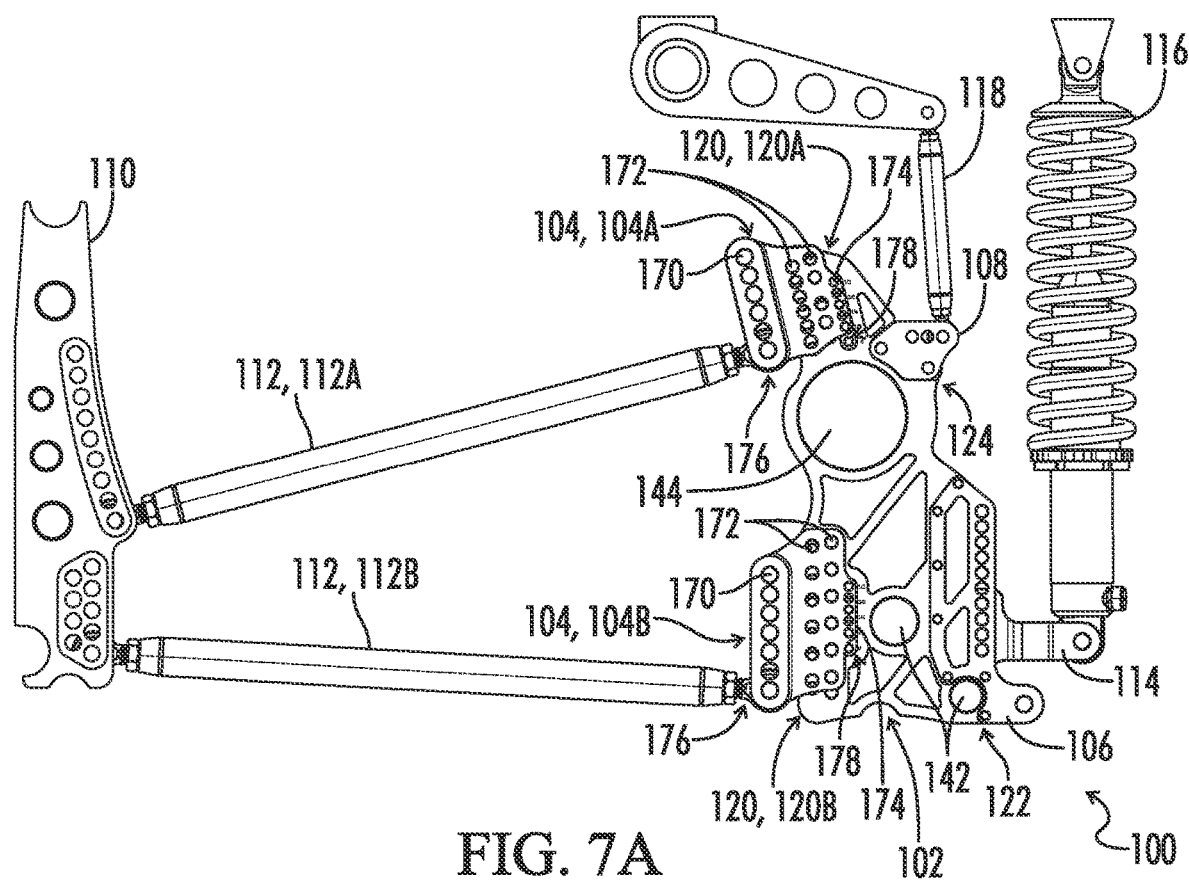
FIG. 7A is a side-perspective view of the bracket assembly of FIG. 2A with an adjustable configuration of a trailing arm, an anti-roll bar, and a shock absorber coupler.
Figure 7B:
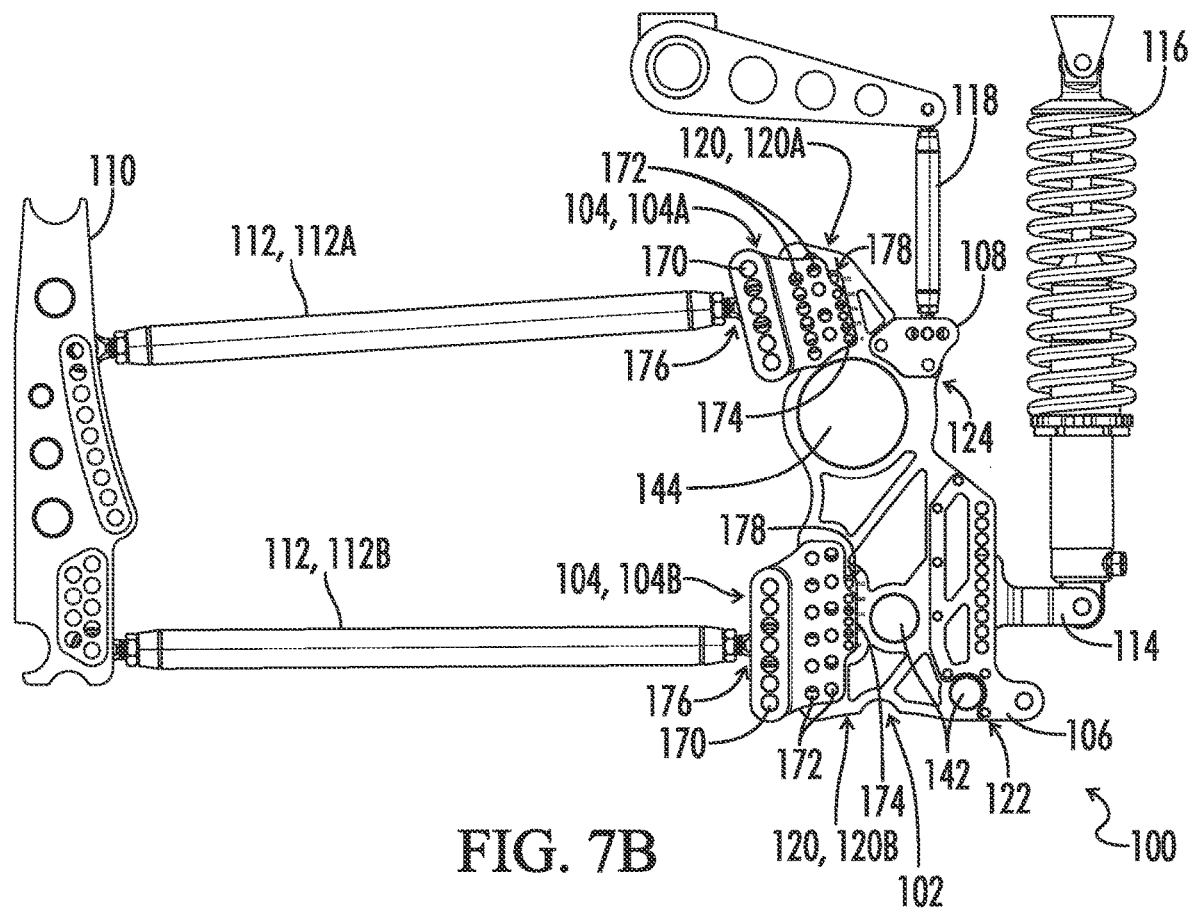
FIG. 7B is a side-perspective view of the bracket assembly of FIG. 2A with another embodiment of the adjustable configuration of the trailing arm, the anti-roll bar, and the shock absorber coupler.
Figure 7C:
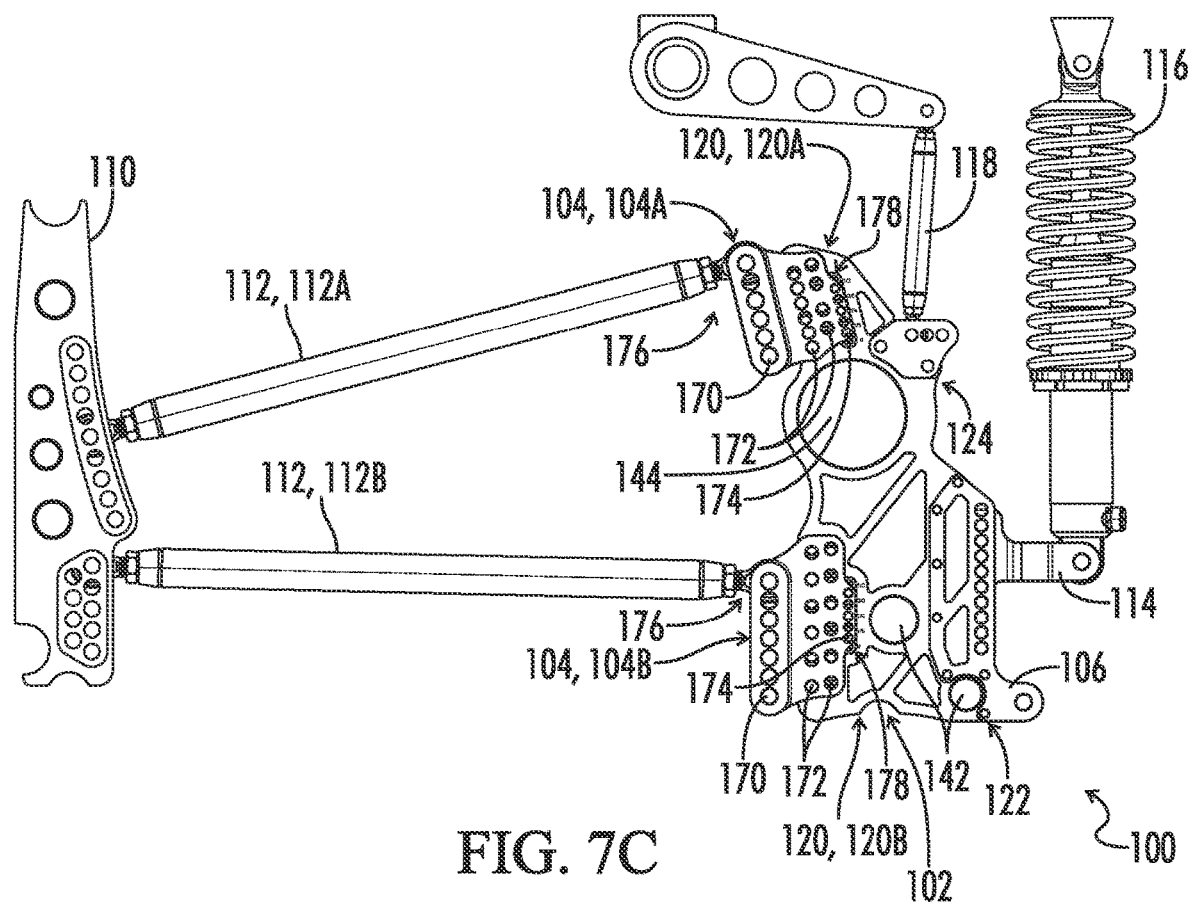
FIG. 7C is a side-perspective view of the bracket assembly of FIG. 2A with another embodiment of the adjustable configuration of the trailing arm, the anti-roll bar, and the shock absorber coupler.

The first plurality of trailing arm bracket holes 170 defines one or more engagement points 176 for receiving the trailing arm 112 configured to be coupled between the at least one trailing arm bracket 104 and the automotive vehicle chassis 10. The trailing arm 112 may include a heim link which may be configured be coupled to the at least one trailing arm bracket 104 between the first and second trailing arm bracket portions 166, 168. As shown in FIGS. 7A-7C, the one or more engagement points 176 may be adjusted relative to the body 102 by adjusting an alignment between the second and third pluralities of trailing arm bracket holes 172, 174 with the first and second pluralities of adjustment holes 160, 162, respectively, of the at least one trailing arm attachment portion 120 of the body 102.

As illustrated in FIG. 7A, an uppermost hole of the third plurality of trailing arm bracket holes 174 of the at least one trailing arm bracket 104 is aligned with an uppermost hole of the second plurality of adjustment holes 162 of the at least one trailing arm attachment portion 120 of the body 102. As illustrated in FIG. 7B, a lowermost hole of the third plurality of trailing arm bracket holes 174 of the at least one trailing arm bracket 104 is aligned with a lowermost hole of the second plurality of adjustment holes 162 of the at least one trailing arm attachment portion 120 of the body 102. As illustrated in FIG. 7C, an intermediate hole—a hole positioned between the uppermost hole and the lowermost hole—of the third plurality of trailing arm bracket holes 174 of the at least one trailing arm bracket 104 is aligned with an intermediate hole (e.g., positioned between the uppermost hole and the lowermost hole) of the second plurality of adjustment holes 162 of the at least one trailing arm attachment portion 120 of the body 102.

At least one of the first and second bracket portions 166, 168 of the at least one trailing arm bracket 104 may include an elongated protrusion 178. The third plurality of trailing arm bracket holes 174 may extend through the elongated protrusion 178 to selectively align with the second plurality of adjustment holes 162 of the at least one trailing arm attachment portion 120 of the body 102. The at least one recessed channel 164 of the at least one trailing arm attachment portion 120 of the body 102 may be configured to slidably receive the elongated protrusion 178 of the at least one trailing arm bracket 104.

The shock attachment portion 122 of the body 102 may include a plurality of attachment holes 180. The shock absorber bracket 106 may be couplable to the shock attachment portion 122 of the body 102. As illustrated, the shock absorber bracket 106 includes a first shock absorber bracket portion 182 and a second shock absorber bracket portion 184. Each of the first and second shock absorber bracket portions 182, 184 may be identical to each other and/or may be mirror images of each other. The first and second shock absorber bracket portions 182, 184 may be configured to be positioned on opposite sides of the shock attachment portion 122 of the body 102. The shock absorber bracket 106, or more specifically each of the first and second shock absorber bracket portions 182, 184, may include a first plurality of shock absorber bracket holes 186 and a second plurality of shock absorber bracket holes 188. Each of the first and second pluralities of shock absorber bracket holes 186, 188 of the first and second shock absorber bracket portions 182, 184, respectively, may be aligned when the shock absorber bracket 106 is coupled to the shock attachment portion 122 of the body 102.

Figure 4A:
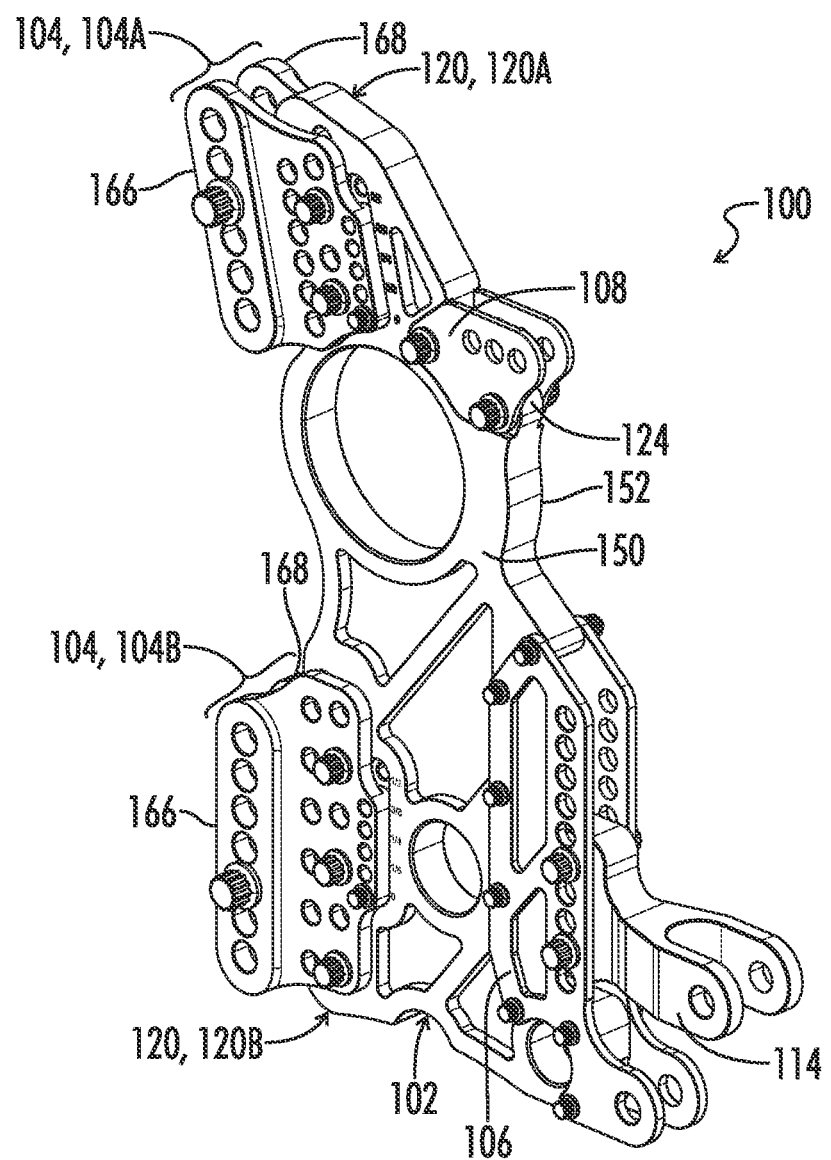
FIG. 4A is a perspective view of the bracket assembly of FIG. 2A in accordance with the present disclosure.
Figure 4B:
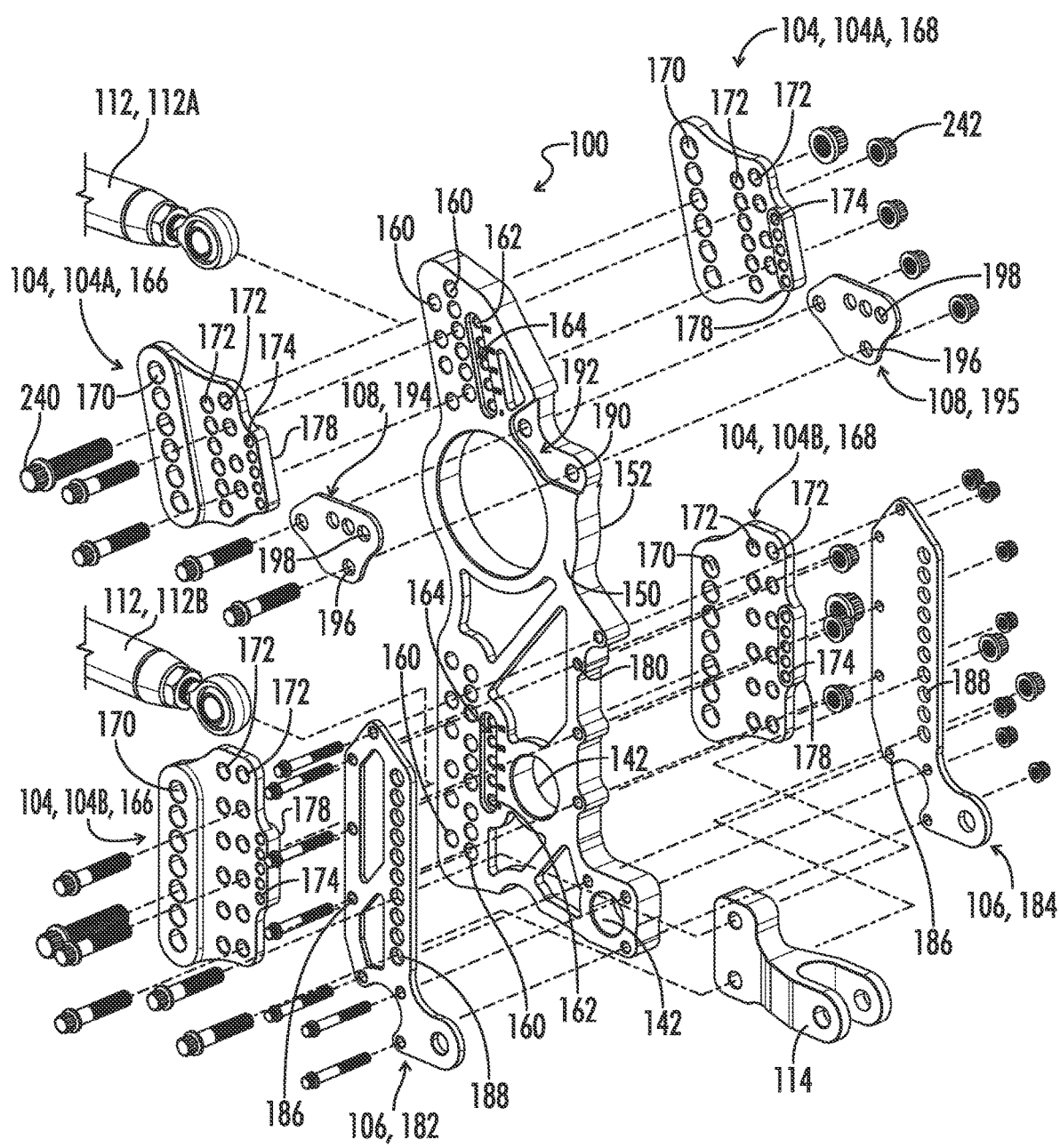
FIG. 4B is an exploded perspective view of the bracket assembly of FIG. 4A in accordance with the present disclosure.
Figure 4C:
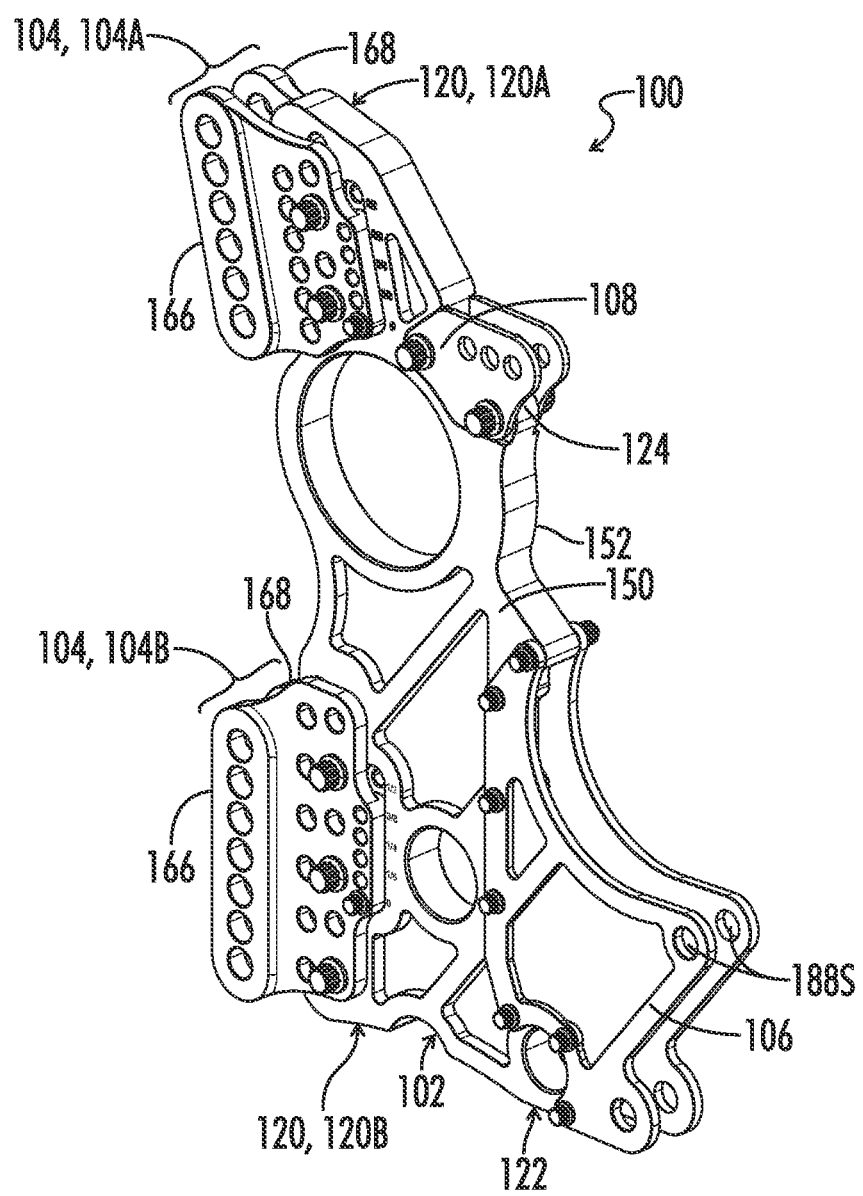
FIG. 4C is a perspective view of the bracket assembly of FIG. 4A having a non-adjustable shock absorber bracket in accordance with the present disclosure.
Figure 4D:
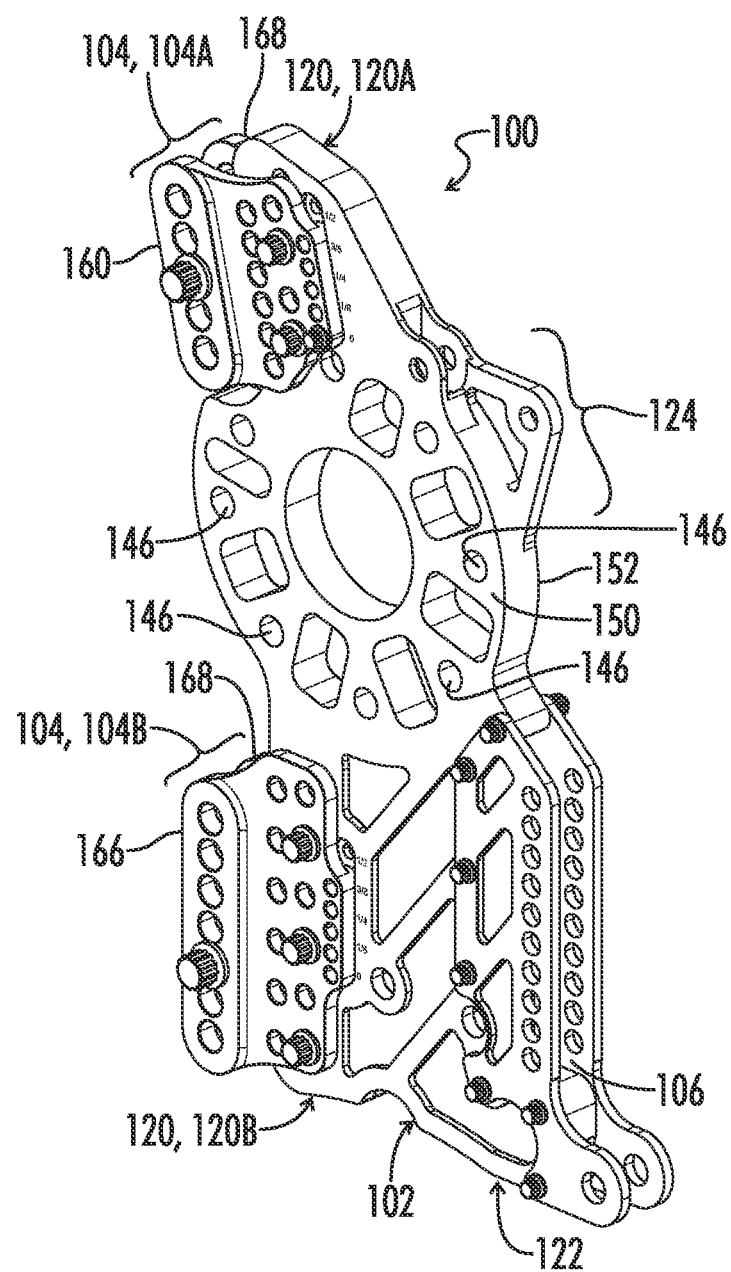
FIG. 4D is a perspective view of the bracket assembly of FIG. 2B having the single layer body of FIG. 3B in accordance with the present disclosure.
Figure 4E:
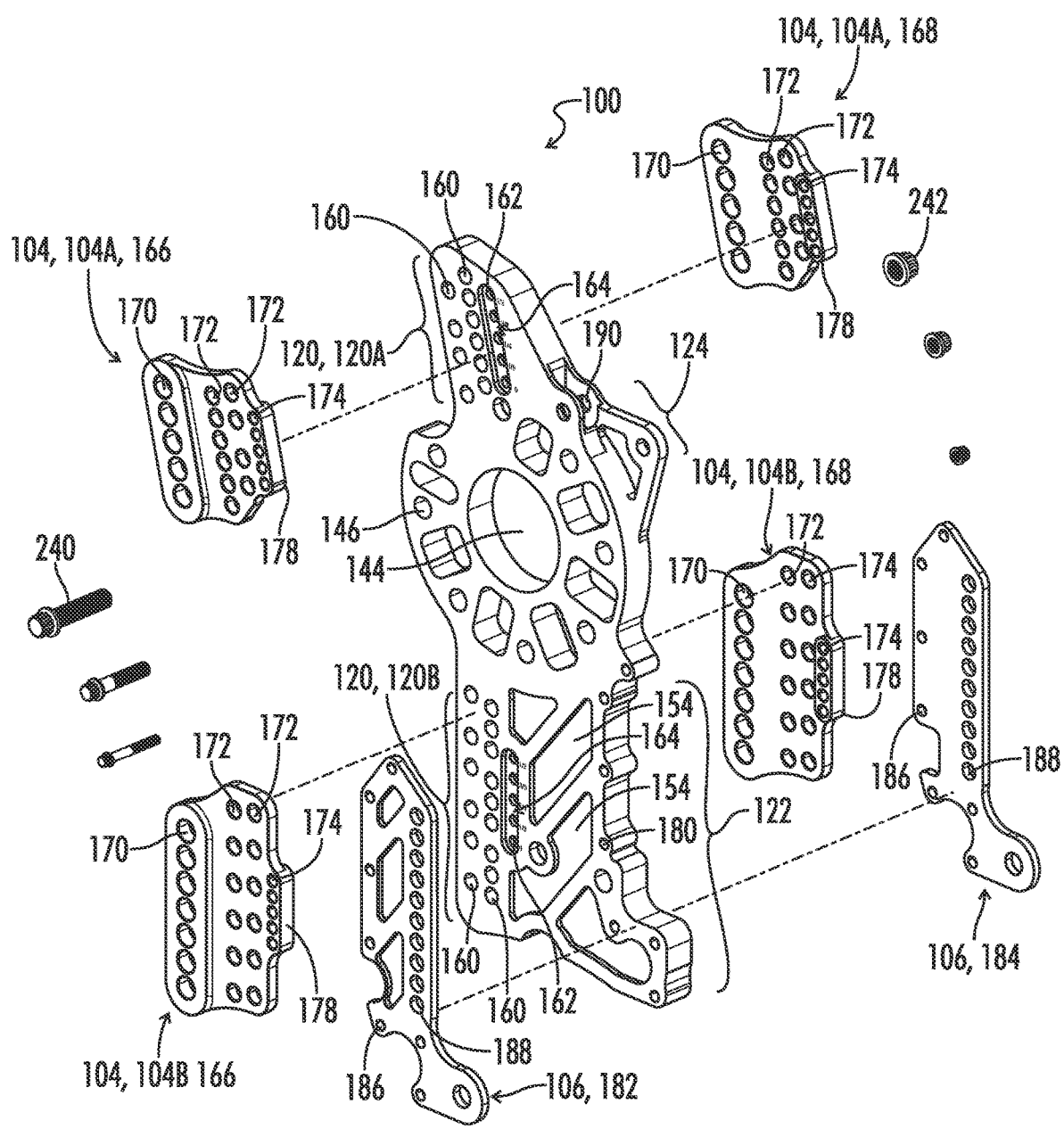
FIG. 4E is an exploded perspective view of the bracket assembly of FIG. 4D in accordance with the present disclosure.
Figure 5A:
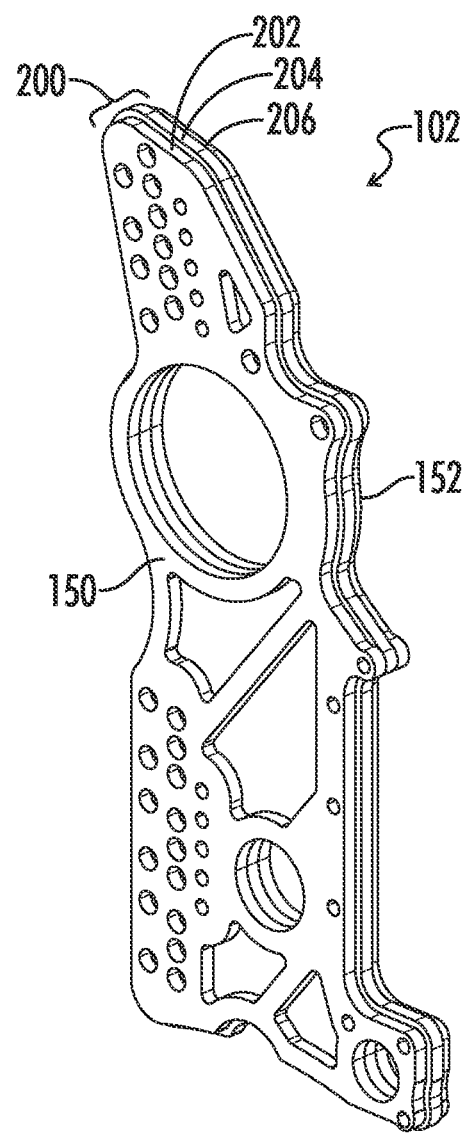
FIG. 5A is a perspective view of the body of FIG. 3A having two or more body layers in accordance with the present disclosure.
Figure 5B:
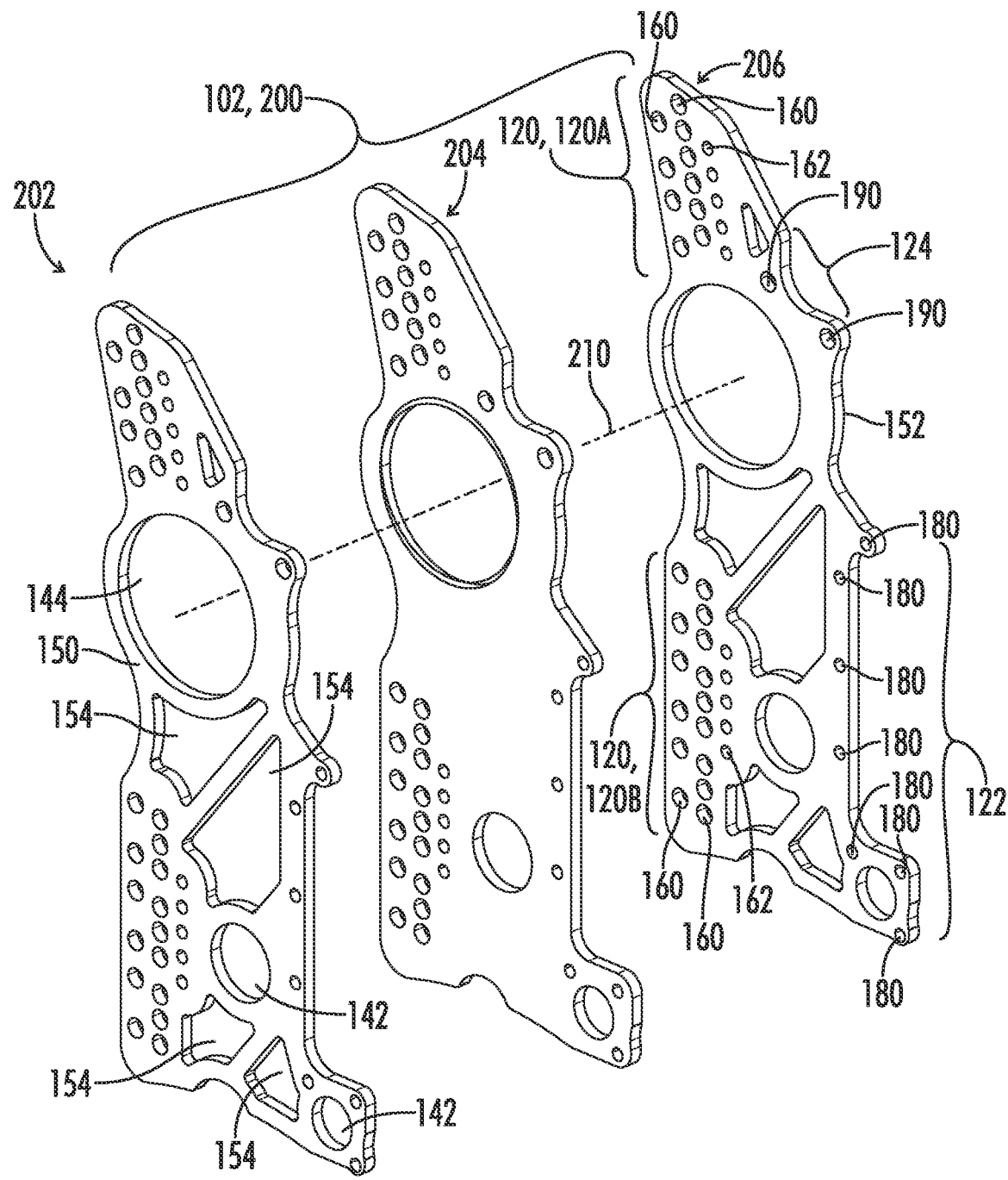
FIG. 5B is an exploded perspective view of the body of FIG. 5A in accordance with the present disclosure.
Figure 5C:
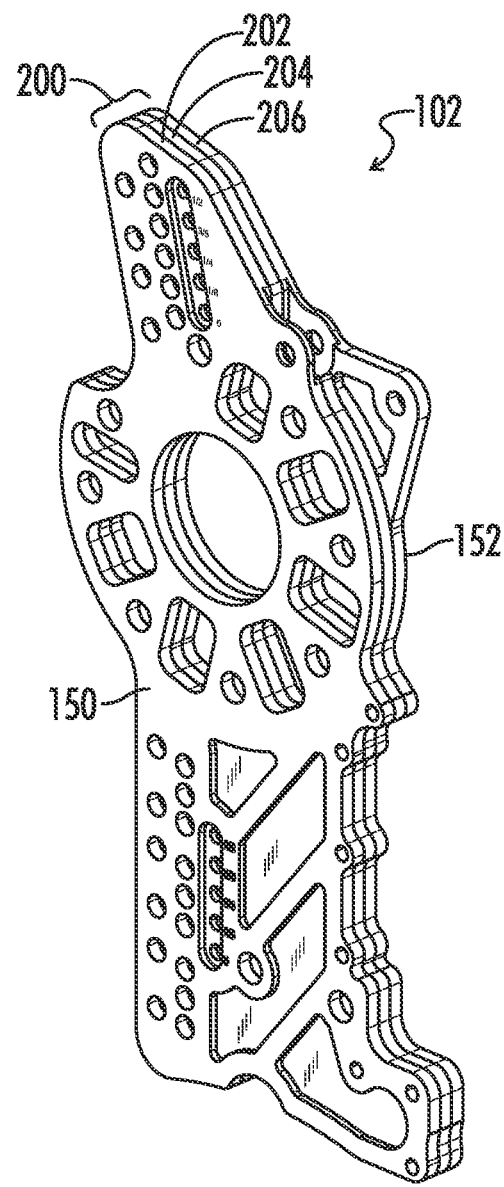
FIG. 5C is a perspective view of the body of FIG. 3B having two or more body layers in accordance with the present disclosure.
Figure 5D:
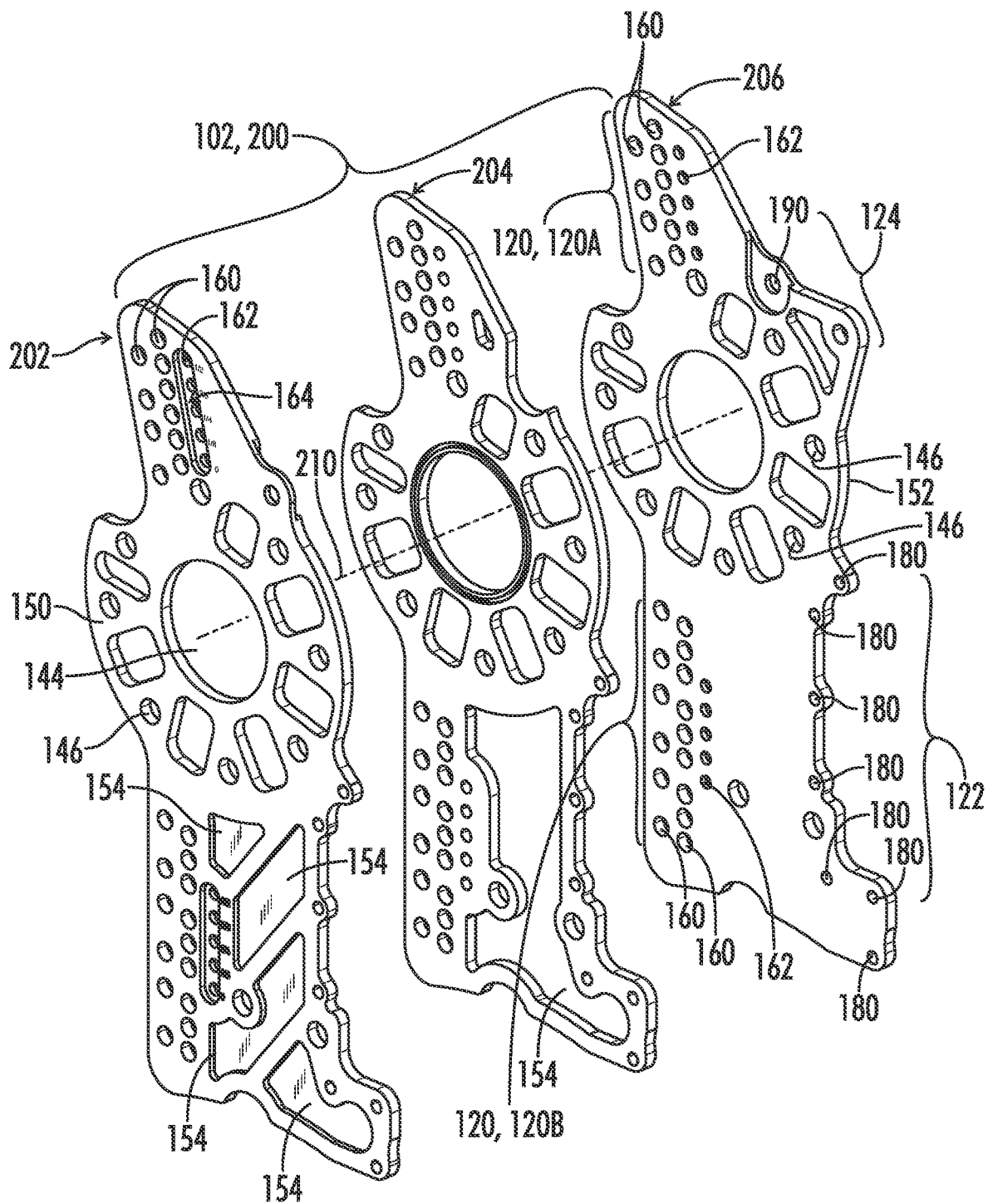
FIG. 5D is an exploded perspective view of the body of FIG. 5C in accordance with the present disclosure.

As illustrated in at least FIGS. 4A and 4B, the first plurality of shock absorber bracket holes 186 of each of the first and second shock absorber bracket portions 182, 184 may be configured to align with the plurality of attachment holes 180 of the shock attachment portion 122 of the body 102. The shock absorber coupler 114 may be selectively couplable to one or more of the aligned second plurality of shock absorber bracket holes 188 of the first and second shock absorber bracket portions 182, 184 to adjust a position of the shock absorber coupler 114 relative to the body 102. Each of the second plurality of shock absorber bracket holes 188 may define one or more engagement points for the shock absorber coupler 114 to attach to and be adjusted relative to the body 102. As described above, the shock absorber coupler 114 is configured to receive the shock absorber 116.

As illustrated in FIG. 4C, the second plurality of shock absorber bracket holes 188 of each of the first and second shock absorber bracket portions 182, 184 may comprise a single hole 188S configured to directly receive the shock absorber coupler 114. As described above, the shock absorber coupler 114 is configured to receive the shock absorber 116. Accordingly, an attachment point of the shock absorber coupler 114 relative to the body 102 is not adjustable as illustrated in FIG. 4C.

The anti-roll bar attachment portion 124 of the body 102 may include one or more attachment holes 190. As illustrated in at least FIG. 3A, the anti-roll bar attachment portion 124 of the body 102 may further include at least one anti-roll bar attachment portion recess 192 defined in at least one of the first or second exterior body surfaces 150, 152. For example, the at least one anti-roll bar attachment portion recess 192 may include a first anti-roll bar attachment portion recess defined in the first exterior body surface 150 and a second anti-roll bar attachment portion recess defined in the second exterior body surface 152. The one or more attachment holes 190 may be defined in the at least one anti-roll bar attachment portion recess 192.

The anti-roll bar bracket 108 may include a first anti-roll bar bracket portion 194 and a second anti-roll bar bracket portion 195. The first anti-roll bar bracket portion 194 may be positionable in the first anti-roll bar attachment portion recess of the at least one anti-roll bar attachment portion recess 192. The first anti-roll bar bracket portion 194 may be positioned flush with the first exterior body surface 150 when positioned within the first anti-roll bar attachment portion recess. The second anti-roll bar bracket portion 195 may be positionable in the second anti-roll bar attachment portion recess of the at least one anti-roll bar attachment portion recess 192. The second anti-roll bar bracket portion 195 may be positioned flush with the second exterior body surface 152 when positioned within the second anti-roll bar attachment portion recess. The first and second anti-roll bar bracket portions 194, 195 may be aligned with each other on opposite sides of the body 102.

The anti-roll bar bracket 108 may include a first plurality of anti-roll bar bracket holes 196 and a second plurality of anti-roll bar bracket holes 198. Each of the first and second pluralities of anti-roll bar bracket holes 196, 198 may span or be defined through the aligned first and second anti-roll bar bracket portions 194, 195. The first plurality of anti-roll bar bracket holes 196 may be configured to align with the one or more attachment holes 190 of the anti-roll bar attachment portion 124 of the body 102. The second plurality of anti-roll bar bracket holes 198 may be configured to selectively receive the anti-roll bar 118, such that a position of the anti-roll bar 118 is adjustable relative to the body 102. Each of the second plurality of anti-roll bar bracket holes 198 may define one or more engagement points for the anti-roll bar 118 to attach to and be adjusted relative to the body 102.

Referring to FIGS. 7A-7C, the one or more engagement points 176 may be adjusted relative to the body 102 by adjusting an alignment between the second and third pluralities of trailing arm bracket holes 172, 174 with the first and second pluralities of adjustment holes 160, 162, respectively, of the at least one trailing arm attachment portion 120 of the body 102. The first plurality of trailing arm bracket holes 170 defines the one or more engagement points 176 for receiving the trailing arm 112, the trailing arm 112 configured to be coupled between the at least one trailing arm bracket 104 between the first and second trailing arm bracket portions 166, 168. By adjusting the one or more engagement points 176 relative to the body 102 by positioning an alignment between the second pluralities of adjustment holes 160, 162, respectively, of the at least one trailing arm attachment portion 120 of the body, and by further configuring the trailing arm 112 to be coupled between the at least one trailing arm bracket 104 between the first and second trailing arm backet portion 166, 168, and by further adjusting the coupling of the trailing arm 112 in the one or more engagement points 176 defined by the first plurality of trailing arm bracket holes 170, the bracket assembly 100 may yield a high number of instant center (I/C) points, including over a thousand I/C points.

The bracket assembly 100 may yield a higher number of instant center (I/C) points, by further adjusting the coupling of the trailing arm 112 with the chassis-mounted bracket 110. The trailing arm 112 is configured to be coupled between the chassis-mounted bracket 110 and each of the at least one trailing arm bracket 104. As depicted in FIGS. 7A-7C, the first trailing arm 112A is coupled between the chassis-mounted bracket 110 and the first trailing arm bracket 104A. A second trailing arm 112B is coupled between the chassis-mounted bracket 110 and the first second trailing arm bracket 104B. In adjusting the mounting point of the first trailing arm 112A and/or the second trailing arm 112B, the bracket assembly 100 may yield an even greater number of instant center (I/C) points, including over a thousand I/C points.

Referring to FIGS. 2B and 5A-6D, the body 102 may include a plurality of body layers 200 (e.g., a multi-layer body) defined between the first exterior body surface 150 and the second exterior body surface 152. The plurality of body layers 200 includes at least two body layers. One of the plurality of body layers 200 may define the first exterior body surface 150 and a different one of the plurality of body layers 200 may define the second exterior body surface 152. As illustrated, the plurality of body layers 200 includes a first body layer 202, a second body layer 204, and a third body layer 206. Accordingly, the first body layer 202 may define the first exterior body surface 150 and the third body layer 206 may define the second exterior body surface 152.

Differences between the body 102 having a single layer, as described above, and the body 102 having the plurality of body layers 200 will now be discussed. The plurality of body layers 200 may be aligned, for example, along or about a central axis 210 extending through the axle tube hole.

The one or more cross tube support holes 142 may be defined through at least two of the plurality of body layers 200. The one or more lightening recess pockets 154 may be defined in at least one of the plurality of body layers 200. The one or more lightening recess pockets 154 may be defined either partially or fully through a given layer of the plurality of body layers 200. As illustrated in FIGS. 5A-6D, the one or more lightening recess pockets 154 may be defined fully through a given layer of the plurality of body layers 200, for example, as illustrated in the first and third body layers 202, 206 of FIGS. 5A-5B and 6A-6B, and as illustrated in the first and second body layers 202, 204 of FIGS. 5C-5D and 6C-6D.

As illustrated in FIGS. 5C-5D and 6C-6D, the first body layer 202 may include the at least one recessed channel 164. Although not illustrated, the third body layer 206 may also include the at least one recessed channel 164.

Figure 6A:
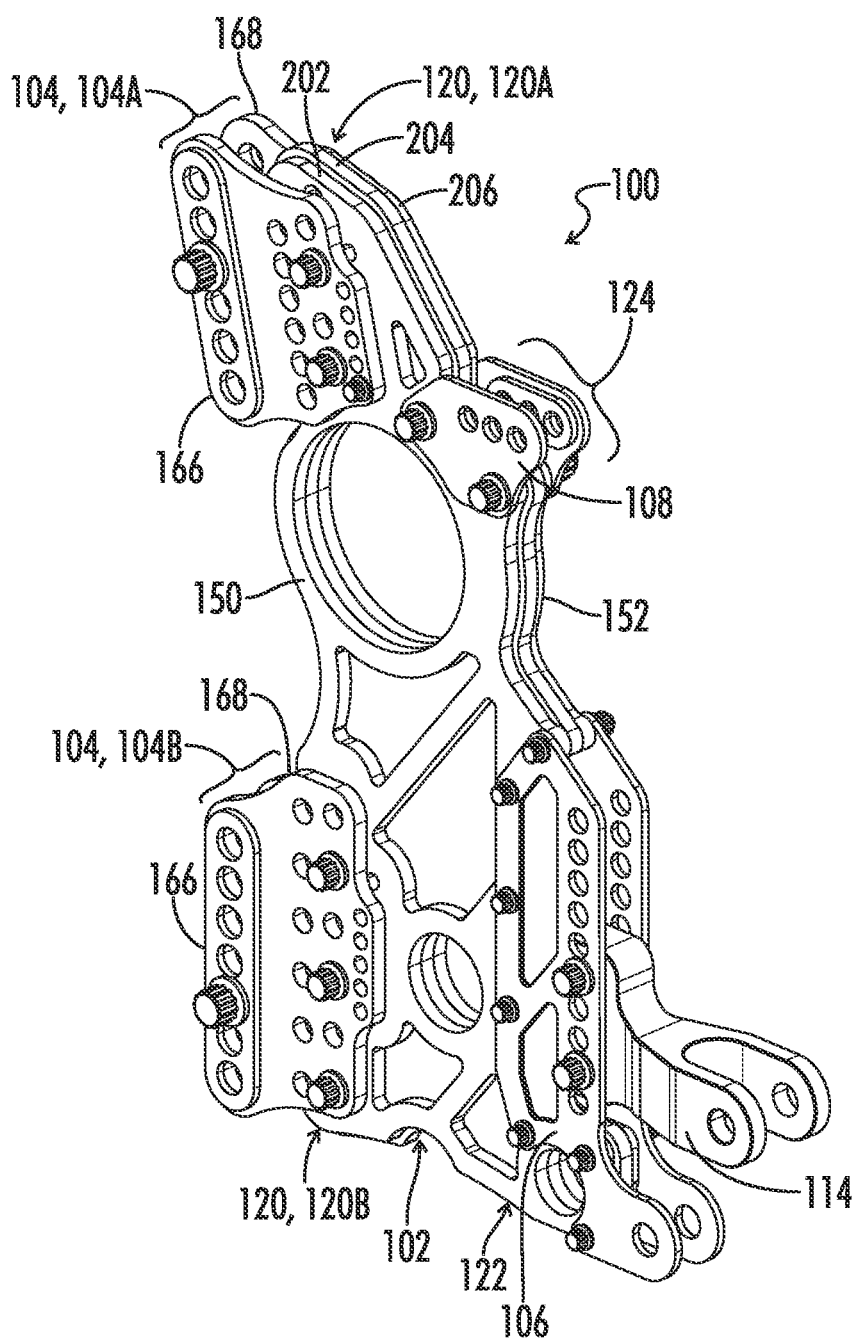
FIG. 6A is a perspective view of the bracket assembly of FIG. 2A having the body of FIG. 5A in accordance with the present disclosure.
Figure 6B:
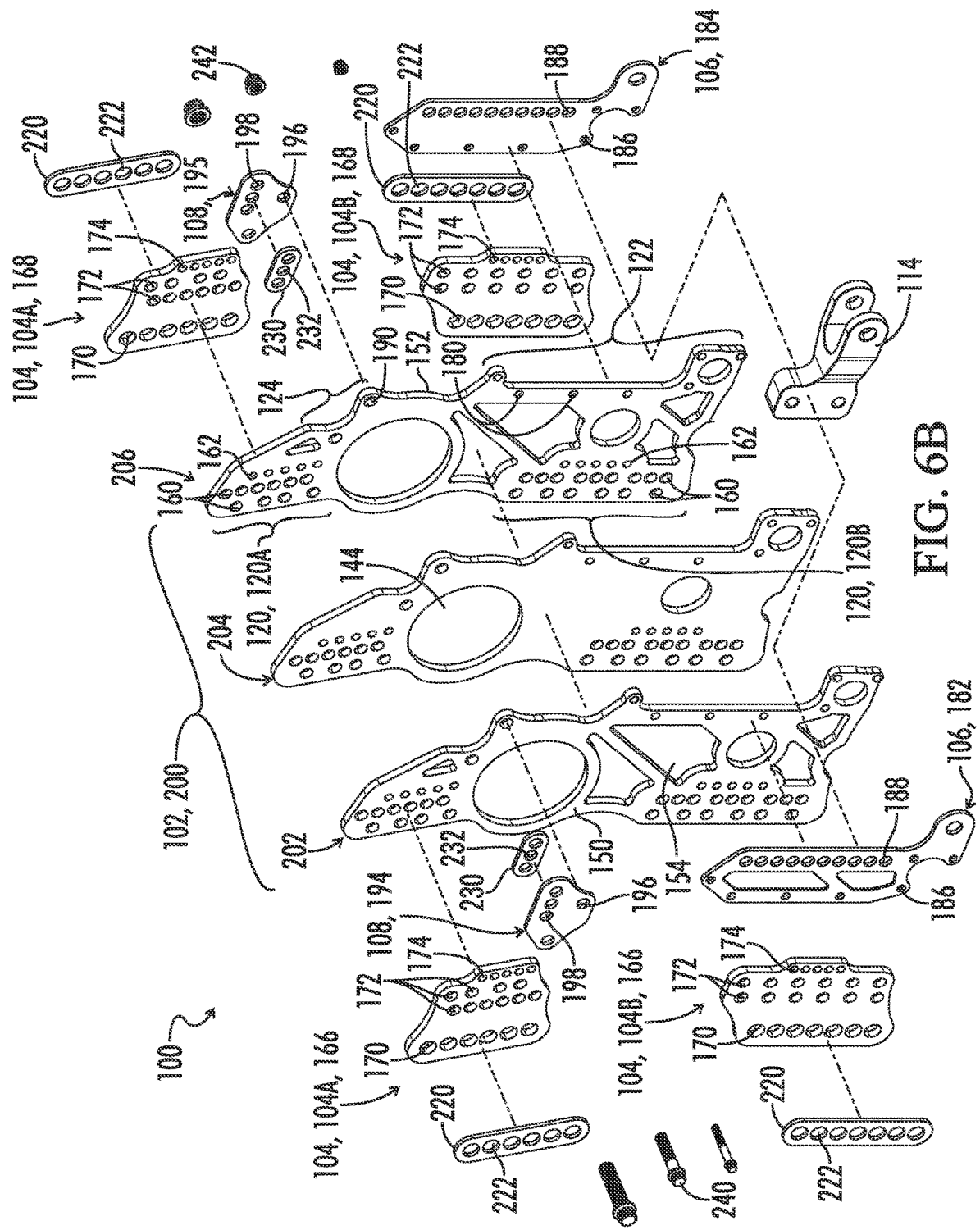
FIG. 6B is an exploded perspective view of the bracket assembly of FIG. 6A in accordance with the present disclosure.
Figure 6C:
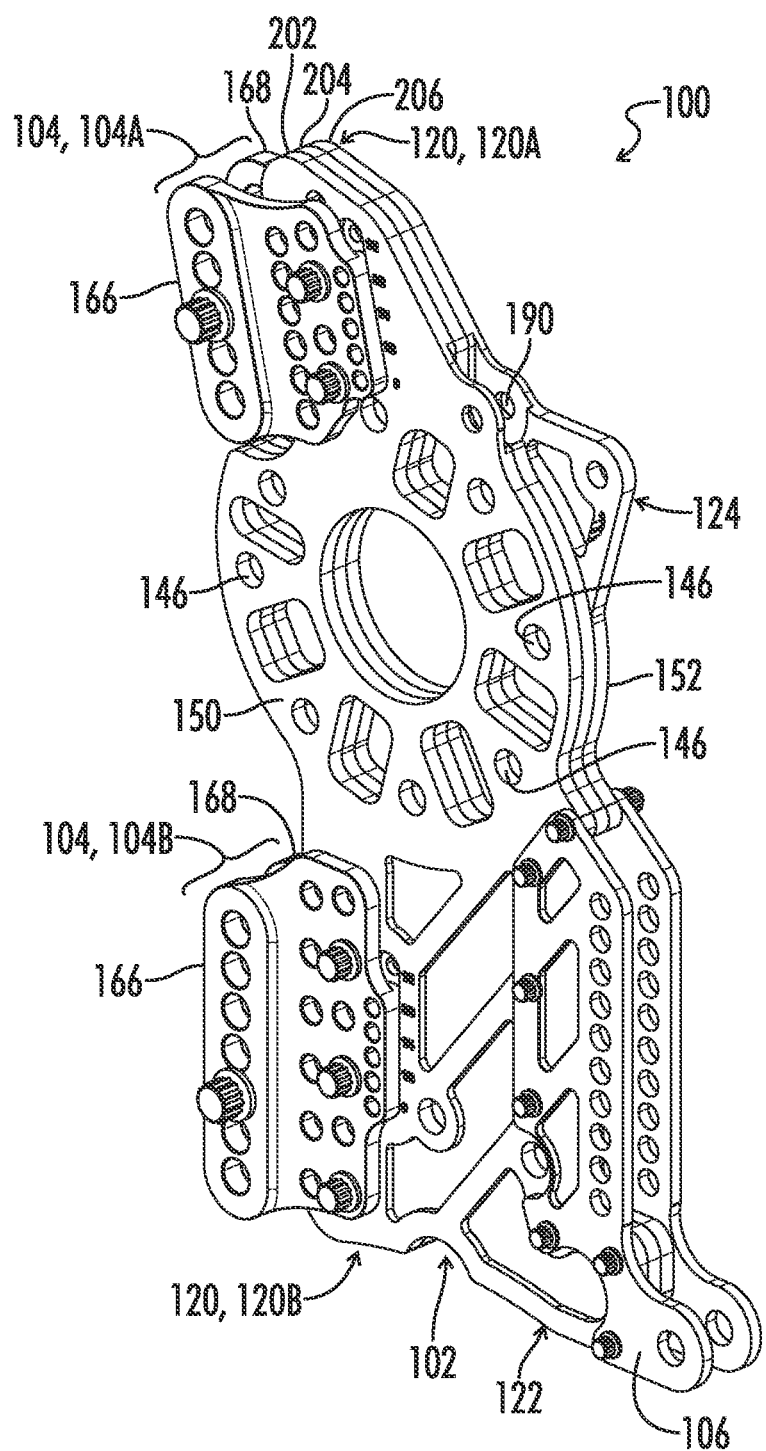
FIG. 6C is a perspective view of the bracket assembly of FIG. 2B having the body of FIG. 5C in accordance with the present disclosure.
Figure 6D:
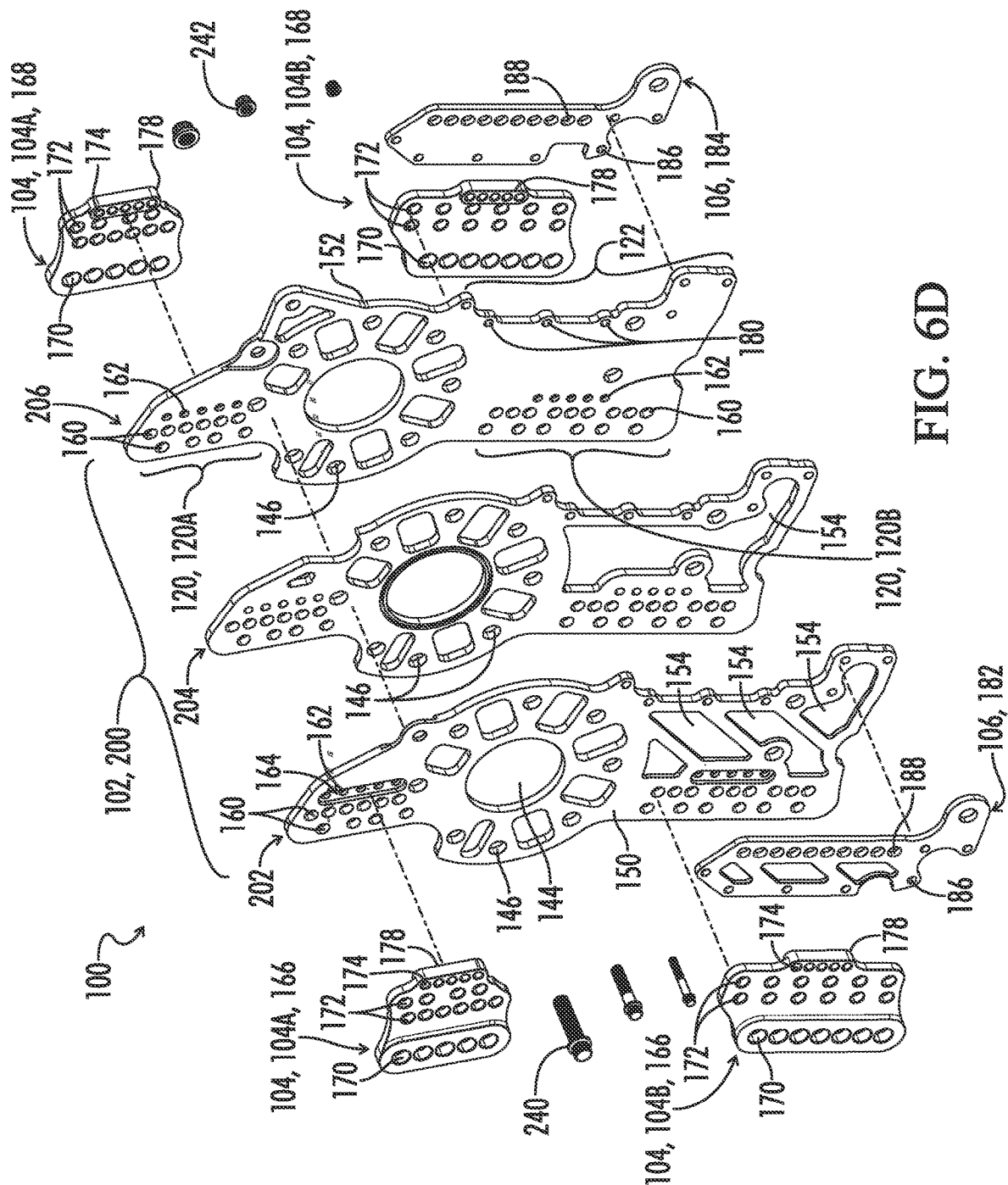
FIG. 6D is an exploded perspective view of the bracket assembly of FIG. 6C in accordance with the present disclosure.

As illustrated in FIG. 6B, the bracket assembly 100 may further include at least one trailing arm doubler 220 and at least one anti-roll bar spacer 230. Each of the at least one trailing arm doubler 220 may include a plurality of trailing arm doubler holes 222. The plurality of trailing arm doubler holes 222 may also be referred to herein as a plurality of doubler holes 222. The at least one trailing arm spacer 220 may be configured to be positioned between the at least one trailing arm bracket 104 and one or more of the first exterior body surface 150 or the second exterior body surface 152 of the body 102. The at least one trailing arm spacer 220 may also be configured to be positioned along the at least one trailing arm bracket 104, such that the trailing arm spacer 220 does not directly contact the one or more of the first exterior body surface 150 or the second exterior body surface 152 of the body 102. The plurality of trailing arm doubler holes 222 may be configured to respectively align with the first plurality of trailing arm bracket holes 170 of the at least one trailing arm bracket 104.

The at least one anti-roll bar spacer 230 may be configured to be positioned between the anti-roll bar attachment portion 124 and the anti-roll bar bracket 108. The at least one anti-roll bar spacer 230 may include a plurality of anti-roll bar spacer holes 232. The plurality of anti-roll bar spacer holes 232 may be configured to respectively align with the second plurality of anti-roll bar bracket holes 198 of the anti-roll bar bracket 108.

Each of the at least one trailing arm bracket 104, the shock absorber bracket 106, and the anti-roll bar bracket 108 may be coupled to the body 102 using a plurality of threaded fasteners 240 and a plurality of nuts 242. Each of the plurality of threaded fasteners 240 may be associated with one nut of the plurality of nuts 242. In other optional embodiments, each of the at least one trailing arm bracket 104, the shock absorber bracket 106, and the anti-roll bar bracket 108 may be coupled to the body 102 using other types of fasteners and/or attachment means, such as welding or the like.

The spacings of the various holes of at least the body 102, the at least one trailing arm bracket 104, the shock absorber bracket 106, the anti-roll bar bracket 108, the chassis-mounted bracket 110, and the shock absorber coupler 114 may provide one-eighths-of-an-inch (⅛") adjustability of the bracket assembly 100 or suspension system provided thereby. In other embodiments, the spacing of these holes may be adjusted to enable even finer adjustability of the suspension system.

In certain optional embodiments, the single layer embodiment of the body 102 may, for example, provide a three-fourths-of-an-inch (¾") thick billet steel or titanium center multi-link bracket with removeable and adjustable heim, anti-roll bar, and shock mount brackets for fabricated welded style housings. In other optional embodiments, the multi-layered embodiment of the body 102 may, for example, provide a one-fourths-of-an-inch (¼") thick steel multi-link bracket in three layers welded or bolted together. In further optional embodiments, the multi-layered embodiment of the body 102 may, for example, provide a one-fourths-of-an-inch (¼") thick steel multi-link bracket in two outer layers, having an inner aluminum or carbon fiber layer.

The bracket assembly 100 provides modularity, removability, and rapid adjustability of a rear multi-link system for stock suspension applications, racecar applications, drag-racing applications, off-road applications, or the like with regard specifically given to the housing 20 of the automotive vehicle chassis 10. This includes fine adjustment of the multi-link bar heim brackets in one-eighths-of-an-inch (⅛") increments with geometry supporting both big- and small-tire combinations, and radial- or drag-slick- tire combinations. The bracket assembly 100 further provides adjustability for the shock absorber coupler 114, either fixed or in adjustments of steps of one-half-of-an-inch (½") increments or the like, and adjustability for the anti-roll bar 118 in adjustments of steps of one-half-of-an-inch (½") increments or the like.

The bracket assembly 100 provides a superior option available for automotive vehicles, particularly for those with racing or drag-racing application. The bracket assembly 100 further provides over one thousand I/C points. The bracket assembly 100 further provides removeable and adjustable upper heim brackets—at least one of the trailing arm bracket 104, such as the first trailing arm bracket 104A—using a unique heavy-duty keyway (e.g., the at least one recessed channel 164 in combination with the elongated protrusion 178), with greater supported favorable suspension ranges by providing adjustable angles to allow for minimal to no adjustment of the trailing arm 112, adjusting through the one-eighth-of-an-inch (⅛") increment sweep for a given hole combination. The bracket assembly 100 further provides removeable and adjustable lower heim brackets—at least one of the trailing arm bracket 104, such as the second trailing arm bracket 104B—using a unique heavy-duty keyway (e.g., the at least one recessed channel 164 in combination with the elongated protrusion 178), with greater supported favorable suspension ranges, as described above.

The bracket assembly 100 may further include a shock absorber bracket 106, which may be removable, having an integrated wheelie bar mounting point and either a fixed shock mounting point or adjustable shock mount points for the shock absorber coupler 114 in one-half-of-an-inch (½") increments. The bracket assembly 100 may further include the anti-roll bar bracket 108, which may be removable, enabling adjustable mount points for the anti-roll bar 118 in one-half-of-an-inch (½") increments. The bracket assembly 100 further provides lower support tube/web integration with built-in wishbone mount point in at least two option—either bolt-on, fully machined support or weld-on, fabricated tubular support. The bracket assembly 100 may be manufactured from various materials and may include options for machining, laser, and waterjet cutting. The bracket assembly 100 features at least one-eighth-inch (⅛") adjustment labels etched in bracket for ease of identifying adjustment for a sweep range of a given hole combination.

The following definitions may help provide a better understanding of the above disclosures.

"Multi-Link Suspension" means a type of automotive suspension system used in independent suspensions or solid-axle suspension, using three or more trailing arms, and one or more longitudinal arms. These arms do not have to be of equal length, and typically, each arm has a spherical joint (e.g., a heim joint) or a rubber bushing at each end of each arm. Consequently, trailing arms react to loads along their length with respect forces of tension and compression, but not with respect to bending.

"Four-Link Suspension" means a type of automotive multi-link suspension system. A typical suspension can have four links for four trailing arms, as well as a track bar, panhard bar, or wishbone. A track bar keeps the axle of the housing centered while allowing the suspension to cycle. Four-link suspension systems generally come in two different types: parallel four-link systems and triangular four-link systems. Parallel four-link systems use four control rods of equal or near-equal length to control vertical, rear-suspension movement. The links are positioned above and below each other from the rear axle forward to the frame of an automotive vehicle. Often, an additional link in the form of panhard rod, track bar, or wishbone, is used to center the suspension laterally. In contrast, triangulated four-link system use two upper links to center the suspension by offsetting their position in relation to lower trailing arms, roughly forming the shape of a triangle on each side of the driveshaft, pointing towards the front (i.e., driver and/or passenger) of the automotive vehicle. The triangular-four link system eliminates the need for an additional stabilizing, such as the track bar, to prevent side-to-side movement.

"Anti-Squat" or "AS" means a maximization of a suspension system that features anti-squat geometry, which optimizes an automotive vehicle's ability to apply a force to a road surface. When this force is applied through the suspension system, the rear of the automotive vehicle pushes up rather than squatting down under power. This effect occurs because for every force applied, there is an equal and opposite reaction. Therefore, when forces are applied by an automotive vehicle chassis to a road surface, the 'equal and opposite' reaction pushes the automotive vehicle chassis upward. In drag racing application, an automotive vehicle chassis that exhibits the foregoing effect has 100% or greater rear anti-squat suspension geometry. For example, with a four-link suspension system mounted on an automotive vehicle chassis, the point of rotation is where a first trailing arm trailing arm, connected to an upper portion of at least one trailing arm attachment portion, and a second trailing arm, connected to lower portion of the at least one trailing arm attachment portion, would theoretically intersect. An adjustable four-link suspension system enables the angle of the first trailing arm and the second trailing arm to be altered, thereby changing the theoretical point of intersection of the first trailing arm and second trailing arm, even to a position on the automotive vehicle chassis that would be practically impossible.

"Heim Joint" means a rod end bearing, also known as a heim. The heim joint is a mechanical articulating joint, which are used on the ends of control rods, steering links, tie rods, or anywhere a precision-articulating joint is required, and where a clevis end—which requires ninety-degree)(90°) alignment between an attached shaft and a second component—is unsuitable. A ball swivel with an opening through which a bolt or other attaching hardware may pass is pressed into a circular casing with a threaded shaft attached. The heim joint is advantageous because the ball swivel permits the rod, or bolt passing through it, to be misaligned to a limited degree.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful BRACKET ASSEMBLY FOR A MULTI-LINK SUSPENSION SYSTESM, it is not intended that such references be construed as limitations upon the scope of this disclosure except as set forth in the following claims.

What is claimed is:

1. A bracket assembly for a multi-link suspension system, said bracket assembly configured to couple a housing to an automotive vehicle, said housing comprising a differential cage and one or more axle tubes, said bracket assembly comprising:
    a body having a first exterior body surface and a second exterior body surface, the second exterior body surface parallel to the first exterior body surface, and the body having an upper portion and a lower portion, the body comprising:
        an axle tube hole disposed between the upper portion and the lower portion of the body, said axle tube hole defined between the first exterior body surface and the second exterior body surface, the axle tube hole configured to receive one of the one or more axle tubes;
        at least one trailing arm attachment portion in the lower portion or the upper portion of the body, the at least one trailing arm attachment portion including a first plurality of adjustment holes and a second plurality of adjustment holes, the first and second pluralities of adjustment holes defined between the first exterior body surface and the second exterior body surface;
        an anti-roll bar attachment portion disposed about the upper portion of the body, the anti-roll bar comprising one or more attachment holes defined between the first exterior body surface and the second exterior body surface; and a shock attachment portion disposed about the lower portion of the body, the shock attachment portion comprising a plurality of attachment holes defined between the first exterior body surface and the second exterior body surface.

2. The bracket assembly of claim 1, wherein:
each of the at least one trailing arm attachment portion, the anti-roll bar attachment portion, and the shock attachment portion of the body are integrally formed.

3. The bracket assembly of claim 1, wherein:
the body further comprises one or more cross tube support holes defined between the first exterior body surface and the second exterior body surface, each of the one or more cross tube support holes configured to receive one of at least one cross tube.

4. The bracket assembly of claim 1, wherein:
the body further comprises one or more lightening pockets, said one or more lightening pockets recessed in at least one of the first exterior body surface or the second exterior body surface.

5. The bracket assembly of claim 1, wherein:
the body further comprises a plurality of cage holes defined between the first exterior body surface and the second exterior body surface and disposed around the axle tube hole, said plurality of cage holes positioned to align with a plurality of endbell holes disposed about the differential cage of the housing.

6. The bracket assembly of claim 1, wherein:
the body includes at least one recessed channel defined in at least one of the first exterior body surface or the second exterior body surface of the body; and
the second plurality of adjustment holes of the trailing arm attachment portion of the body are positioned within the at least one recessed channel.

7. The bracket assembly of claim 1, wherein:
the at least one trailing arm attachment portion includes a first trailing arm attachment portion and a second trailing arm attachment portion; and
the upper portion contains the first trailing arm attachment portion and the lower portion contains the second trailing arm attachment portion.

8. The bracket assembly of claim 1, further comprising:
at least one trailing arm bracket couplable to the at least one trailing arm attachment portion of the body, the at least one trailing arm bracket including a first plurality of trailing arm bracket holes, a second plurality of trailing arm bracket holes, and a third plurality of trailing arm bracket holes, at least one hole of the second plurality of trailing arm bracket holes configured to align with a corresponding at least one hole of the first plurality of adjustment holes of the at least one trailing arm attachment portion when one of the third plurality of trailing arm bracket holes aligns with a corresponding one of the second plurality of adjustment holes of the at least one trailing arm attachment portion.

9. The bracket assembly of claim 8, wherein:
the third plurality of trailing arm bracket holes are defined through a laterally elongated protrusion of the at least one trailing arm bracket, the laterally elongated protrusion configured to be slidably received in a recessed channel of the body in which the second plurality of adjustment holes of the at least one trailing arm attachment portion are positioned.

10. The bracket assembly of claim 8, wherein:
one or more of the first plurality of trailing arm bracket holes is configured to receive a trailing arm to selectively position the trailing arm relative to the body.

11. The bracket assembly of claim 1, wherein:
the one or more attachment holes of the anti-roll bar attachment portion is recessed in the body relative to at least one of the first exterior body surface or the second exterior body surface.

12. The bracket assembly of claim 1, further comprising:
at least one anti-roll bar bracket including a first plurality of anti-roll bar bracket holes and a second plurality of anti-roll bar bracket holes, the first plurality of anti-roll bar bracket holes configured to align with the one or more attachment holes of the anti-roll bar attachment portion of the body.

13. The bracket assembly of claim 12, wherein:
one or more of the second plurality of anti-roll bar bracket holes is configured to receive an anti-roll bar to selectively position the anti-roll bar relative to the body.

14. The bracket assembly of claim 12, wherein:
the anti-roll bar attachment portion further includes at least one anti-roll bar attachment portion recess defined in at least one of the first or second exterior body surfaces; and
the at least one anti-roll bar attachment portion recess configured to receive the at least one anti-roll bar bracket.

15. The bracket assembly of claim 12, wherein:
the at least one anti-roll bar bracket includes a first anti-roll bar bracket portion and a second anti-roll bar bracket portion, the first anti-roll bar bracket portion positionable closer to the first exterior body surface than to the second exterior body surface, the second anti-roll bar bracket portion positionable closer to the second exterior body surface than to the first exterior body surface; and
each hole of the first and second pluralities of anti-roll bar bracket holes is defined through the first and second anti-roll bar bracket portions.

16. The bracket assembly of claim 1, further comprising:
at least one shock absorber bracket including a first plurality of shock absorber bracket holes and a second plurality of shock absorber bracket holes, the first plurality of shock absorber bracket holes configured to align with the plurality of attachment holes of the shock attachment portion of the body.

17. The bracket assembly of claim 16, further comprising:
a shock absorber coupler is selectively couplable to one or more of the second plurality of shock absorber bracket holes to selectively position the shock absorber coupler relative to the body.

18. The bracket assembly of claim 16, wherein:
the at least one shock absorber bracket includes a first shock absorber bracket portion positionable along the first exterior body surface and a second shock absorber bracket portion positionable along the second exterior body surface; and
each hole of the first and second pluralities of shock absorber bracket holes is defined through the first and second shock absorber bracket portions.

19. The bracket assembly of claim 1, wherein:
the body comprises a plurality of body layers defined between the first exterior body surface and the second exterior body surface.

20. The bracket assembly of claim 19, wherein:
at least two of the plurality of body layers define the first exterior body surface and the second exterior body surface, respectively.

21. The bracket assembly of claim 19, further comprising:
one or more lightening pockets defined at least partially through at least one of the plurality of body layers.

22. The bracket assembly of claim 19, further comprising:
at least one trailing arm doubler including a plurality of doubler holes, the at least one trailing arm doubler positioned against at least one trailing arm bracket to respectively align the plurality of doubler holes with a first plurality of trailing arm bracket holes of the at least one trailing arm bracket.

23. The bracket assembly of claim 19, further comprising:
at least one anti-roll bar spacer including a plurality of anti-roll bar spacer holes, the at least one anti-roll bar spacer positioned against at least one anti-roll bar bracket to respectively align the plurality of anti-roll bar spacer holes with a plurality of anti-roll bar bracket holes of the at least one anti-roll bar bracket.

* * * * *